(12) United States Patent
Brown et al.

(10) Patent No.: US 12,298,252 B2
(45) Date of Patent: May 13, 2025

(54) AUTOMATED SYSTEMS FOR REMOVING TISSUE SAMPLES FROM SEEDS, AND RELATED METHODS

(71) Applicant: MONSANTO TECHNOLOGY LLC, St. Louis, MO (US)

(72) Inventors: Wayne Brown, St. Charles, MO (US); Michael Joseph Dayawon, St. Louis, MO (US); David Finley, St. Louis, MO (US); William Michael Fischer, St. Peters, MO (US); Yang Ju Im, Ellisville, MO (US); John Michael Jensen, St. Charles, MO (US); Jeffrey Lawrence Kohne, Kirkwood, MO (US); Matthew J. Weis, St. Louis, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 49 days.

(21) Appl. No.: 18/201,091

(22) Filed: May 23, 2023

(65) Prior Publication Data
US 2023/0296530 A1    Sep. 21, 2023

Related U.S. Application Data

(63) Continuation of application No. 16/625,386, filed as application No. PCT/US2018/038294 on Jun. 19, 2018, now Pat. No. 11,698,345.
(Continued)

(51) Int. Cl.
  *G01N 21/85*    (2006.01)
  *G01N 1/04*    (2006.01)
(Continued)

(52) U.S. Cl.
  CPC ............... *G01N 21/85* (2013.01); *G01N 1/04* (2013.01); *G01N 1/286* (2013.01); *G01N 35/04* (2013.01);
(Continued)

(58) Field of Classification Search
  None
  See application file for complete search history.

(56) References Cited

U.S. PATENT DOCUMENTS 3,850,286 A    11/1974    Tobin, Jr.
4,720,753 A    1/1988    Iwasaki et al.
(Continued)

FOREIGN PATENT DOCUMENTS

CN    86100831 A    8/1986
CN    101080765 A    11/2007
(Continued)

*Primary Examiner* — Daniel S Larkin
(74) *Attorney, Agent, or Firm* — Harness, Dickey & Pierce, P.L.C.

(57) ABSTRACT

A seed sampling system is provided comprising an automated seed loading assembly operable to singulate seeds from a plurality of seeds or enable loading of individually stored seeds and an automated seed sampling assembly comprising at least one sampling module operable to remove tissue samples from one of the singulated seeds. The system also includes an automated seed transport assembly comprising at least one retention member operable to transfer the singulated seeds from at least one elevator unit of the seed loading assembly to the at least one sampling module of the seed sampling assembly. In connection therewith, the at least one sampling module includes multiple sampling locations, each associated with a sampler, where the at least one sampling module is operable to remove tissue samples from
(Continued)

seeds at one of sampling locations while another one of the sampling locations is cleaned to remove residual seed tissue therefrom.

16 Claims, 22 Drawing Sheets

Related U.S. Application Data

(60) Provisional application No. 62/523,072, filed on Jun. 21, 2017.

(51) Int. Cl.
*G01N 1/28* (2006.01)
*G01N 35/04* (2006.01)
*G01N 15/00* (2006.01)

(52) U.S. Cl.
CPC ............ *G01N 2001/2873* (2013.01); *G01N 2015/0019* (2013.01); *G01N 2021/8592* (2013.01); *G01N 2035/0496* (2013.01)

(56) References Cited

U.S. PATENT DOCUMENTS

| | | | |
|---|---|---|---|
| 7,502,113 B2 | 3/2009 | Deppermann et al. |
| 7,591,101 B2 | 9/2009 | Deppermann |
| 7,596,496 B2 | 9/2009 | Jabloun |
| 7,611,842 B2 | 11/2009 | Deppermann et al. |
| 7,703,238 B2 | 4/2010 | Deppermann et al. |
| 7,767,883 B2 | 8/2010 | Deppermann et al. |
| 7,830,516 B2 | 11/2010 | Deppermann et al. |
| 7,832,143 B2 | 11/2010 | Deppermann et al. |
| 7,849,632 B2 | 12/2010 | Deppermann et al. |
| 7,877,926 B2 | 2/2011 | Deppermann |
| 7,941,969 B2 | 5/2011 | Deppermann et al. |
| 7,998,669 B2 | 8/2011 | Deppermann et al. |
| 8,028,469 B2 | 10/2011 | Deppermann et al. |
| 8,071,845 B2 | 12/2011 | Deppermann et al. |
| 8,076,076 B2 | 12/2011 | Osborn et al. |
| 8,245,439 B2 | 8/2012 | Deppermann et al. |
| 8,312,672 B2 | 11/2012 | Deppermann et al. |
| 8,434,259 B2 | 5/2013 | Deppermann |
| 8,436,225 B2 | 5/2013 | Deppermann et al. |
| 8,443,545 B2 | 5/2013 | Deppermann et al. |
| 8,501,480 B2 | 8/2013 | Deppermann et al. |
| 8,539,703 B2 | 9/2013 | DeMarco |
| 8,561,346 B2 | 10/2013 | Deppermann et al. |
| 8,863,436 B2 | 10/2014 | Becker et al. |
| 8,959,833 B2 | 2/2015 | Deppermann et al. |
| 8,997,398 B2 | 4/2015 | Deppermann et al. |
| 9,003,696 B2 | 4/2015 | Deppermann |
| 9,027,278 B2 | 5/2015 | Deppermann et al. |
| 9,383,291 B2 | 7/2016 | Deppermann et al. |
| 9,448,141 B2 | 9/2016 | Deppermann |
| 9,551,636 B2 | 1/2017 | Deppermann et al. |
| 9,986,699 B2 | 6/2018 | Deppermann et al. |
| 10,132,725 B2 | 11/2018 | Deppermann |
| 10,254,200 B2 | 4/2019 | Deppermann et al. |
| 10,542,661 B2 | 1/2020 | Deppermann et al. |
| 10,705,102 B2 | 7/2020 | Deppermann et al. |
| 10,775,275 B2 | 9/2020 | Deppermann |
| 11,006,593 B2 | 5/2021 | Butruille et al. |
| 11,293,840 B2 | 4/2022 | Deppermann et al. |
| 11,530,963 B2 | 12/2022 | Deppermann et al. |
| 2007/0207485 A1 | 9/2007 | Deppermann et al. |
| 2008/0150798 A1 | 6/2008 | Curry et al. |
| 2008/0317279 A1 | 12/2008 | Deppermann et al. |
| 2009/0061449 A1 | 3/2009 | Osborn et al. |
| 2011/0160068 A1 | 6/2011 | Becker et al. |
| 2012/0117865 A1 | 5/2012 | Deppermann et al. |
| 2013/0192135 A1* | 8/2013 | Deppermann ......... A01C 1/042 47/56 |
| 2015/0241322 A1 | 8/2015 | Deppermann et al. |
| 2015/0319914 A1 | 11/2015 | McCarty, II et al. |
| 2015/0321353 A1 | 11/2015 | McCarty, II et al. |
| 2017/0027102 A1 | 2/2017 | Fredericksen et al. |
| 2021/0148830 A1 | 5/2021 | Brown et al. |

FOREIGN PATENT DOCUMENTS

| | | |
|---|---|---|
| CN | 101868141 A | 10/2010 |
| CN | 102686099 A | 9/2012 |
| CN | 103118527 A | 5/2013 |
| CN | 103257054 A | 8/2013 |
| CN | 103406287 A | 11/2013 |
| CN | 103913583 A | 7/2014 |
| WO | WO2008/150798 | 12/2008 |
| WO | WO2018/236874 | 12/2018 |

\* cited by examiner

AUTOMATED SYSTEMS FOR REMOVING TISSUE SAMPLES FROM SEEDS, AND RELATED METHODS

CROSS-REFERENCE TO RELATED APPLICATIONS

This application is a continuation of U.S. patent application Ser. No. 16/625,386, filed on Dec. 20, 2019, now U.S. Pat. No. 11,698,345, which is a U.S. National Stage of International Application No. PCT/US2018/038294, filed on Jun. 19, 2018, which claims the benefit of, and priority to, U.S. Provisional Application No. 62/523,072, filed on Jun. 21, 2017. The entire disclosure of each of the above applications is incorporated herein by reference.

FIELD

The present disclosure generally relates to automated systems and methods for removing tissue samples from biological materials such as, for example, seeds, etc.

BACKGROUND

This section provides background information related to the present disclosure which is not necessarily prior art.

In plant development, genetic improvements are made in the plant, either through selective breeding or genetic manipulation, and when a desirable improvement is achieved, a commercial quantity is developed, or bulked, by planting and harvesting seeds over several generations. However, not all harvested seeds express the desired traits and, thus, these seeds need to be culled from the bulked quantity. To hasten the process of bulking up the quantity of seeds, statistical samples may be taken and tested to cull seeds (or groups of seeds associated with the statistical samples), from the original quantity of seeds, that do not adequately express the desired trait.

SUMMARY

This section provides a general summary of the disclosure, and is not a comprehensive disclosure of its full scope or all of its features.

Exemplary embodiments of the present disclosure generally relate to automated seed sampling assemblies. In one such embodiment, an automated seed sampling assembly generally includes at least one sampling module having multiple sampling locations, each associated with a sampler, wherein the at least one sampling module is operable to remove tissue samples from seeds at one of sampling locations while another one of the sampling locations is cleaned to remove residual seed tissue therefrom.

Exemplary embodiments of the present disclosure also generally relate to seed sampling systems. In one such embodiment, a seed sampling system generally includes an automated seed loading assembly operable to singulate seeds from a plurality of seeds (or load an individual seed from a group of individually held seeds), where the seed loading assembly comprises multiple laterally spaced elevator units each of which is operable to actuate one of the singulated seeds into a position generally above the elevator unit. The system also includes an automated seed sampling assembly comprising multiple laterally spaced sampling modules operable to remove tissue samples from one of the singulated seeds, and an automated seed transport assembly comprising multiple laterally spaced retention members operable to transfer the singulated seeds from the elevator units of the seed loading assembly to the sampling modules of the seed sampling assembly. In connection therewith, the lateral spacing between the elevator units of the seed loading assembly, the lateral spacing between the sampling modules of the automated seed sampling assembly, and the lateral spacing between the retention members of the automated seed transport assembly are generally or about the same.

Exemplary embodiments of the present disclosure further relate, generally, to automated methods for removing tissue samples from seeds. In one such embodiment, a method generally includes singulating a seed from a plurality of seeds; engaging the singulated seed with a retention member of an automated seed transport assembly; orienting the seed at the retention member, moving the oriented seed to a sampling module of an automated seed sampling assembly; and removing a tissue sample from the singulated seed at the sampling module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

FIGS. 1-20 illustrate an example embodiment of an automated seed sampling system 10 including one or more aspects of the present disclosure. The illustrated system 10 is suitable for use in removing samples from biological materials (e.g., sampling the materials, chipping the materials, etc.). Samples may include, for example, tissue samples, etc. And, biological materials may include, for example, seeds, etc. Again, the example embodiment is provided for illustrative purposes only, and may be used in connection with one or more of the methods disclosed herein.

Figure 1:
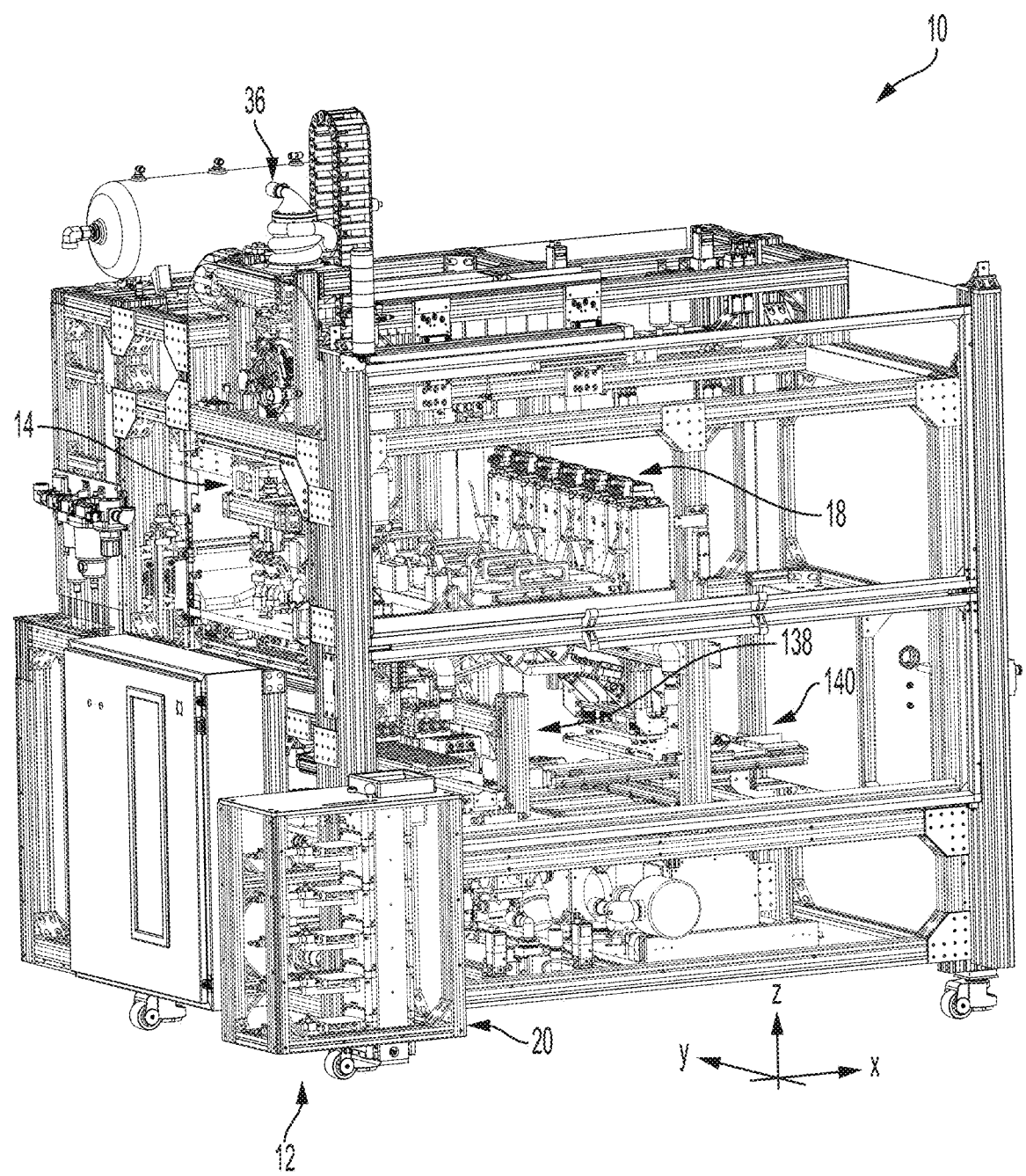
FIG. 1 is a perspective view of a seed sampling system including one or more aspects of the present disclosure and configured to singulate seeds and remove tissue samples from the singulated seeds.
Figure 2:
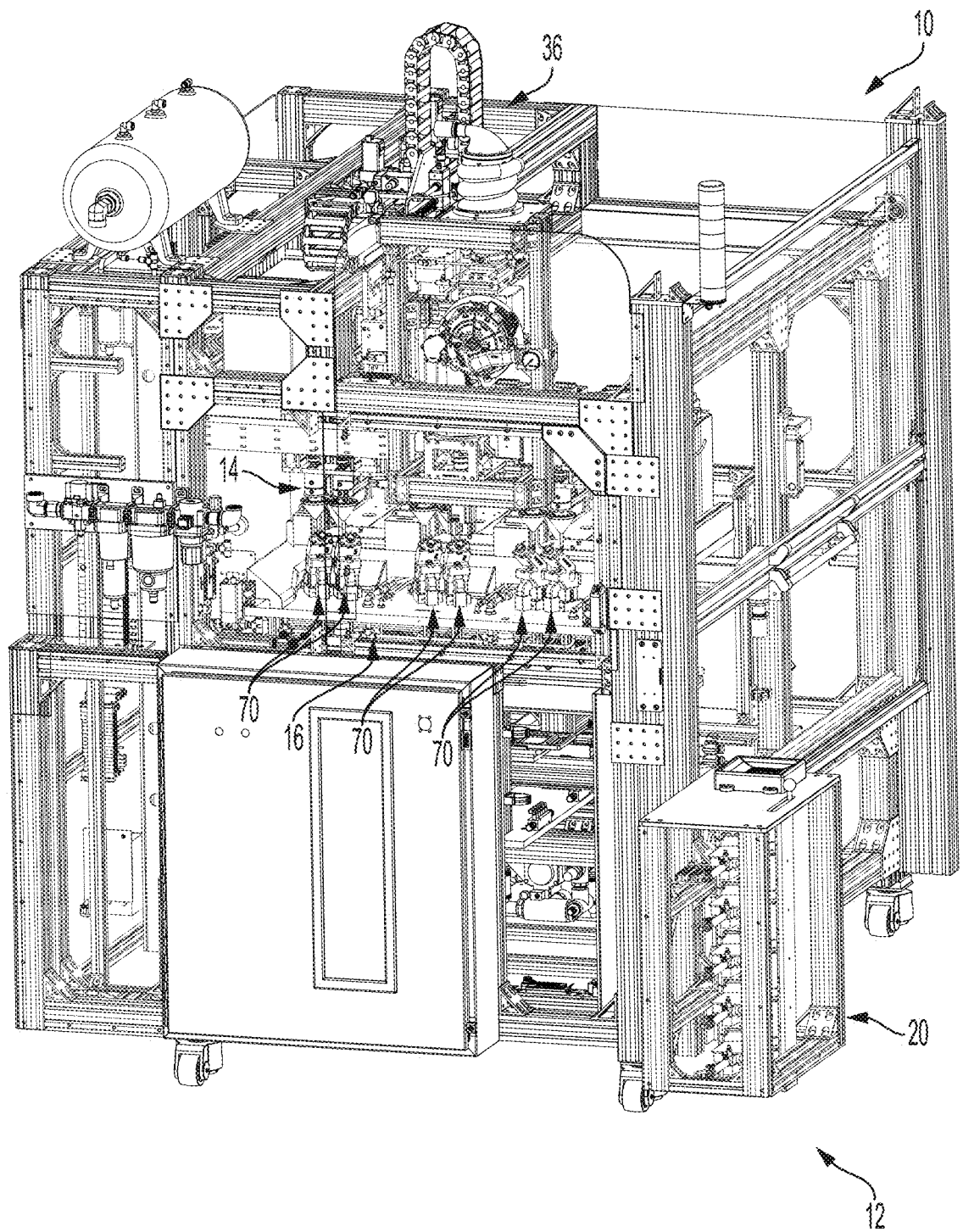
FIG. 2 is another perspective view of the seed sampling system of FIG. 1.
Figure 3:
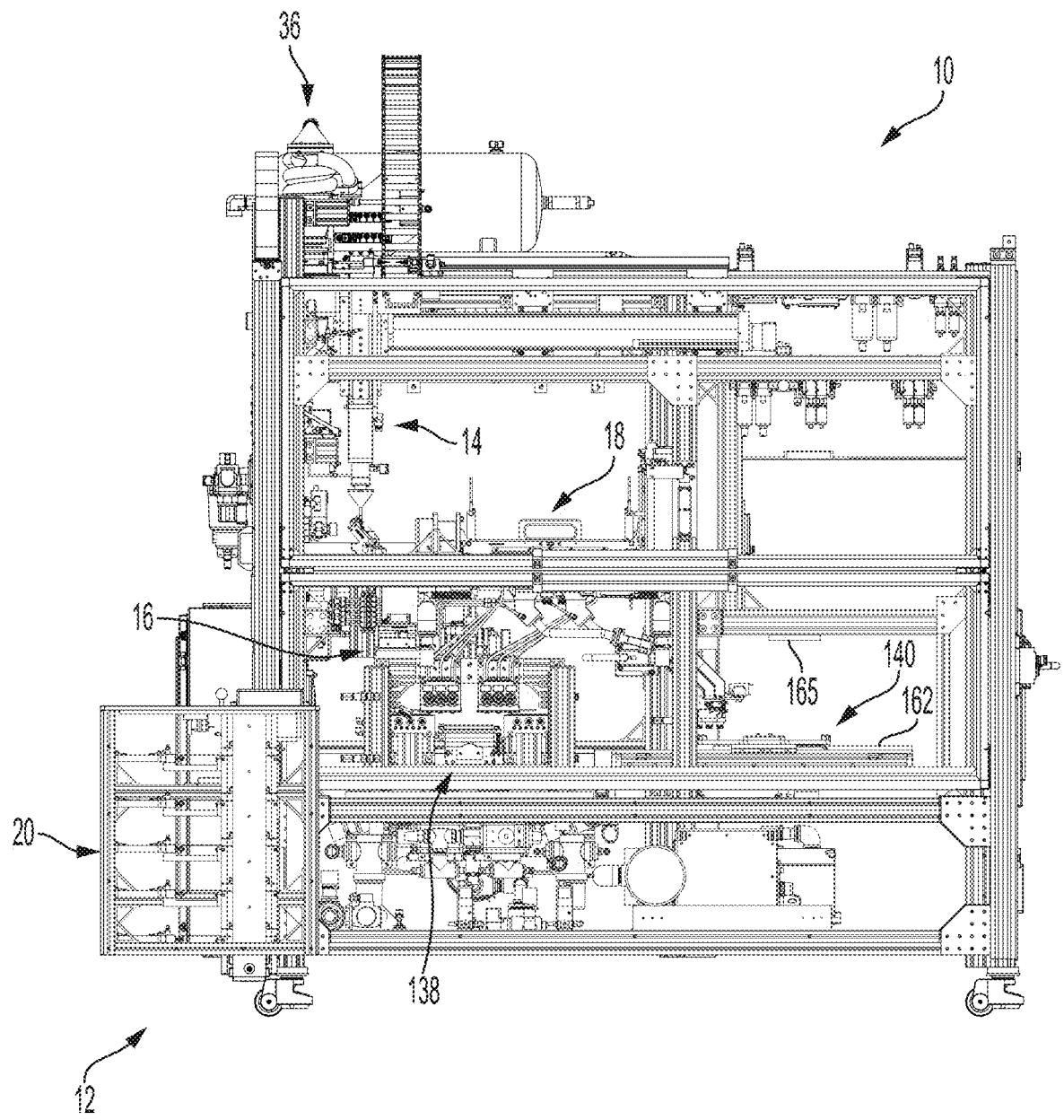
FIG. 3 is a side view of the seed sampling system of FIG. 1.

As shown in FIGS. 1-3, the seed sampling system 10 generally includes an automated seed loading assembly 12, an automated seed transport assembly 14, an automated seed imaging assembly 16, and an automated seed sampling assembly 18. Generally, the seed loading assembly 12 operates (as part of a method herein) to singulate (or isolate, or select, etc.) individual seeds from a quantity (e.g., a plurality, etc.) of seeds, and/or load a group of individual seeds (e.g., a group of such singulated seeds, etc.) to the seed sampling system 10. In turn, the seed transport assembly 14, which is disposed generally above the seed imaging assembly 16 and the seed sampling assembly 18, operates to move the singulated seeds from the seed loading assembly 12 to the seed imaging assembly 16 and then to the seed sampling assembly 18, where tissue samples are ultimately removed from the singulated seeds (e.g., a single sample from each of the seeds, multiple samples from each of the seeds, etc.). And, the tissue samples, along with the seeds from which the tissue samples are removed, are collected so that a relationship is maintained therebetween (e.g., a one-to-one relationship so that the seeds can be subsequently identified based on the samples removed therefrom, etc.). The tissue samples may then be analyzed to determine if the corresponding seeds, from which the tissue samples were taken, exhibit or do not exhibit one or more desired traits. And, based on the analysis, the corresponding seeds from which the tissue samples were removed can be subsequently identified and used as desired.

Operation of the seed sampling system 10, and the seed loading assembly 12, seed transport assembly 14, seed imaging assembly 16, and seed sampling assembly 18 thereof, is automated and may be controlled (and/or coordinated), for example, by a central control system (broadly, a computing device, etc.) within the scope of the present disclosure. In addition, components of the seed loading assembly 12, seed transport assembly 14, and/or seed sampling assembly 18 may be pneumatically operated using, for example, desired air flows, etc. Such pneumatic operations may apply to moving seeds through the seed sampling system 10 and between the assemblies 12, 14, 18. Such pneumatic operations may also include drawing seeds through the seed sampling system 10 (e.g., via vacuum processes, etc.), forcing seeds through the system 10 (e.g., via air jets, etc.), actuating components of the seed sampling system 10, and/or combinations thereof, for example, to help inhibit damage of seeds during transport, to facilitate efficient operation of the components of the system 10, etc.

In the illustrated embodiment, the seed loading assembly 12, seed transport assembly 14, seed imaging assembly 16, and seed sampling assembly 18 are supported by various structures such as stationary braces, beams, platforms, pedestals, stands, etc. and include various couplings (e.g., valves, tubing connectors, etc.). Although such structures and/or couplings are necessary to the construction of the seed sampling system 10, description of their placement, orientation and interconnections are not necessary for one skilled in the art to easily and fully comprehend the structure, function and operation of the seed sampling system 10. Particularly, such structures are clearly illustrated throughout the figures and, as such, their placement, orientation and interconnections are easily understood by one skilled in the art.

The seed loading assembly 12 of the seed sampling system 10 includes a queuing station 20 for receiving seeds from seed packets, or other seed containment devices (e.g., tubes, cells, cassettes, cylinders, plates, etc.), for sampling (where the seed packets can include any desired types and/or quantities of seeds, for example, as described herein). The seed packets may represent different projects, or groupings of seeds, desired to be analyzed for one or more reasons (e.g., for one or more of the reasons described herein, etc.). Each seed packet generally includes an indicia associated therewith (e.g., a barcode, a QR code, an RFID tag, a magnetic tag, a magnetic strip, an alphabetic and/or numeric indicia, another indicia, etc.). The indicia, then, can be used to identify logistic data regarding the respective seed packet (and the seeds included therein). Such logistic data may be generated based on specific genotypes or attributes of each particular seed in the seed packet and may include, for example, characteristics and/or traits such as type, size, shape, color, composition, quality, weight, genetic traits, etc. of the seeds therein. In addition, the logistic data may include data indicating whether or not the seeds in the seed packet are to be analyzed and, for seeds that are to be analyzed, the particular analysis to be performed and the particular sampling requirements for the seeds and/or their required analysis (e.g., including a number of tissue samples to be taken from the seeds, etc.). The logistic data may then be used, by the central control system (or directly by the system 10) to set, direct, update, modify, etc. the various components of the system 10 as described herein so that appropriate tissue samples are removed from the given seeds and so that appropriate analysis of the tissue samples may be performed (particularly, for example, where the system 10 is integrated with one or more analysis units configured to perform the different analyses described herein). With that said, such logistic data may relate to (without limitation) the types of seeds in the seed packet, sample sizes for such seeds, an analysis to be performed, a number of samples required for such analysis, etc. The logistic data can be compiled in any suitable or desirable format, for example, the logistic data can be compiled into one or more electronic data structures, databases, spreadsheets and/or look-up tables, etc. that are then accessible to the seed sampling system 10 (e.g., via a suitable network, etc.) and/or users thereof.

As an example, to initiate operation of the seed sampling system 10, the indicia from a given seed packet may be input to the control system (e.g., via a user interface, via communication with a reader/input device, etc.), which is in communication with the seed sampling system 10 via a network, etc. In particular, for example, the queuing station 20 may include a reader configured to scan (broadly, read) the indicia on a given seed packet, or a separate reader (e.g., a handheld scanner input device, etc.) may be used to scan the indicia. In either case, in turn, a processor associated with the control system may access the logistic data associated with the seed packet in a logistics data structure (e.g., in a data structure in memory associated with the processor of the control system, in a remote data structure accessible by the processor of the control system via a network, etc.). Then, based on the logistic data, the processor may control operation of the system 10 as described in detail below (even though the processor may not be expressly referenced), to setup custom processing conditions (e.g., air pressures, vacuum pressures, component positions, timings, tissue removal parameters, etc.) to remove desired tissue samples from the seeds in the given seed packet, etc. In various embodiments, the indicia associated with the seed packets may be automatically read, or interpreted, by a user interface and automatically input to the control system. In one instance, the indicia may include a barcode and the user interface may include a suitable barcode reader. Thus, to initiate operation of the system 10, a user or operator may scan the barcode using the barcode reader, and the processor of the control system may then interpret the barcode, access the logistic data in the data structure corresponding to the barcode, and control the operation of the system 10 as appropriate (e.g., based on the logistic data, the system 10 may determine sample sizes, numbers of samples, etc. for the seeds in the seed packets; etc.).

Figure 4:
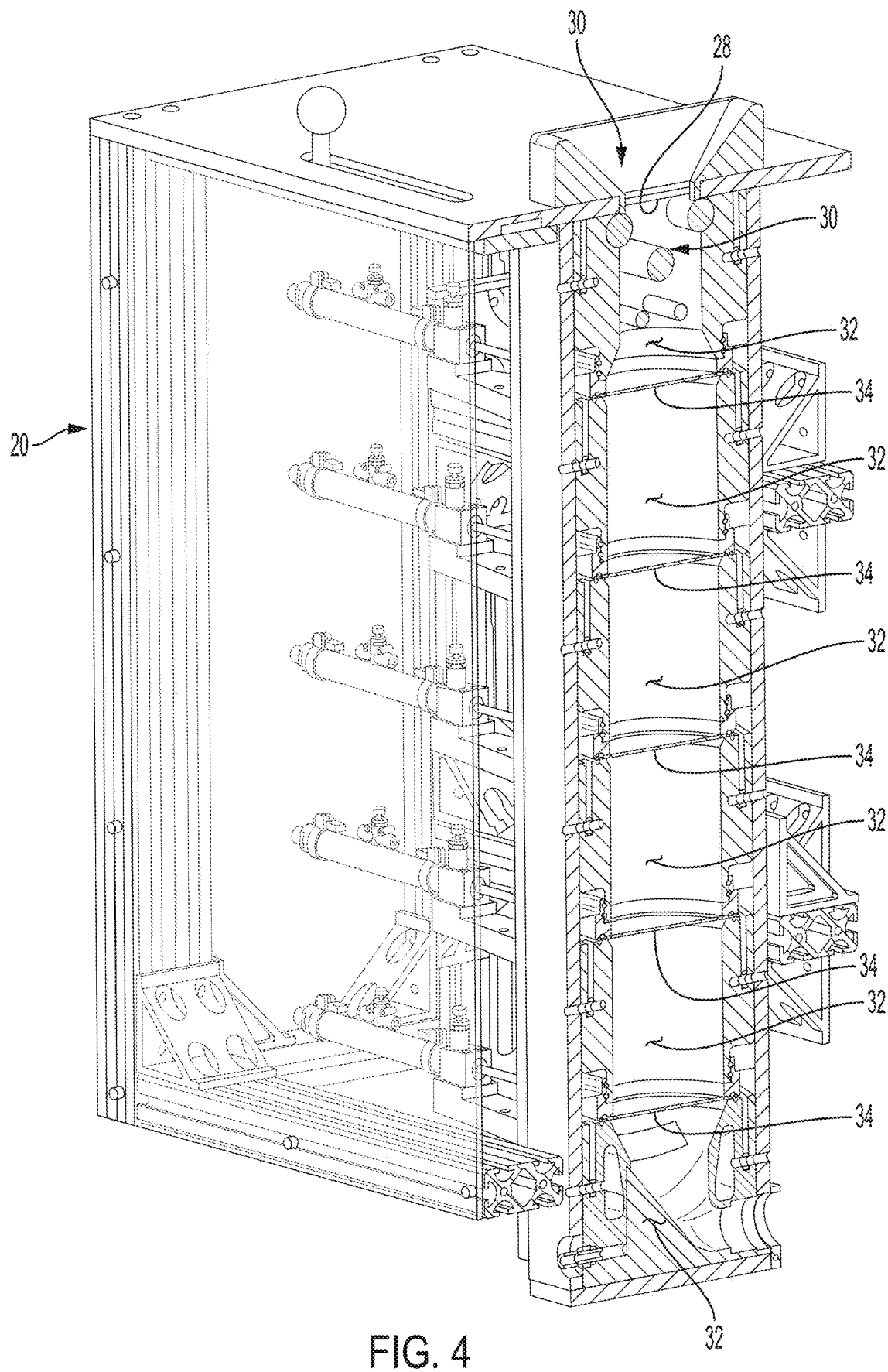
FIG. 4 is a perspective view of part of a seed loading assembly of the system of FIG. 1 illustrating a queuing station of the seed loading assembly.

With additional reference to FIG. 4, upon scanning a given seed packet, when the corresponding seeds in the seed packet are to be sampled and analyzed using the seed sampling system 10, the system 10 is configured to actuate a door 28 of the queuing station 20 (e.g., open the door 28, unlock the door 28, etc.), so that one or more desired seeds from the seed packet can be received into the queuing station 20 (e.g., based on the initial scanning, etc.). In connection therewith, the queuing station 20 includes a filter unit 30 (e.g., a filter screen, magnetic bars, combinations thereof, etc.) for use in removing undesired and/or unwanted contaminants from the received seeds. As the seeds move through the filter unit 30, they are received in one of multiple queues 32 of the queuing station 20, in preparation for subsequent processing. In the illustrated embodiment, the queuing station 20 includes six queues 32, each separated by a moveable barrier 34 (or gate) for selectively holding (and segregating) different groupings of seeds from different seed packets received in the queuing station 20 (such that six different groupings of seeds, or projects, can be processed in the illustrated system 10, in sequence, as desired (with each held in one of the six different queues 32)). It should be appreciated that the queuing station 20 may include other numbers of the queues 32 in other embodiments (e.g., other than six, at least one, at least two, greater than six, etc.), depending on operational needs, etc. In addition, the queuing station 20 may be configured such that different ones of the queues 32 can be processed together (e.g., seeds in different ones of the queues 32 can be moved together in the system 100, etc.) to potentially create a larger queue (comprised of multiple ones of the individual queues 32, etc.) for holding larger quantities of seeds.

Then in the seed sampling system 10, when the desired seeds (from the desired number of seed packets) are received in the queuing station 20, the seed sampling system 10 is configured to move the seeds, within one of the queues 32 (e.g., the bottom most queue 32 in FIG. 4, etc.), to a seed singulation unit 36 of the seed loading assembly 12 (e.g., via induced air flow such as vacuum pressure and suitable tubing (not shown), etc.).

Figure 5:
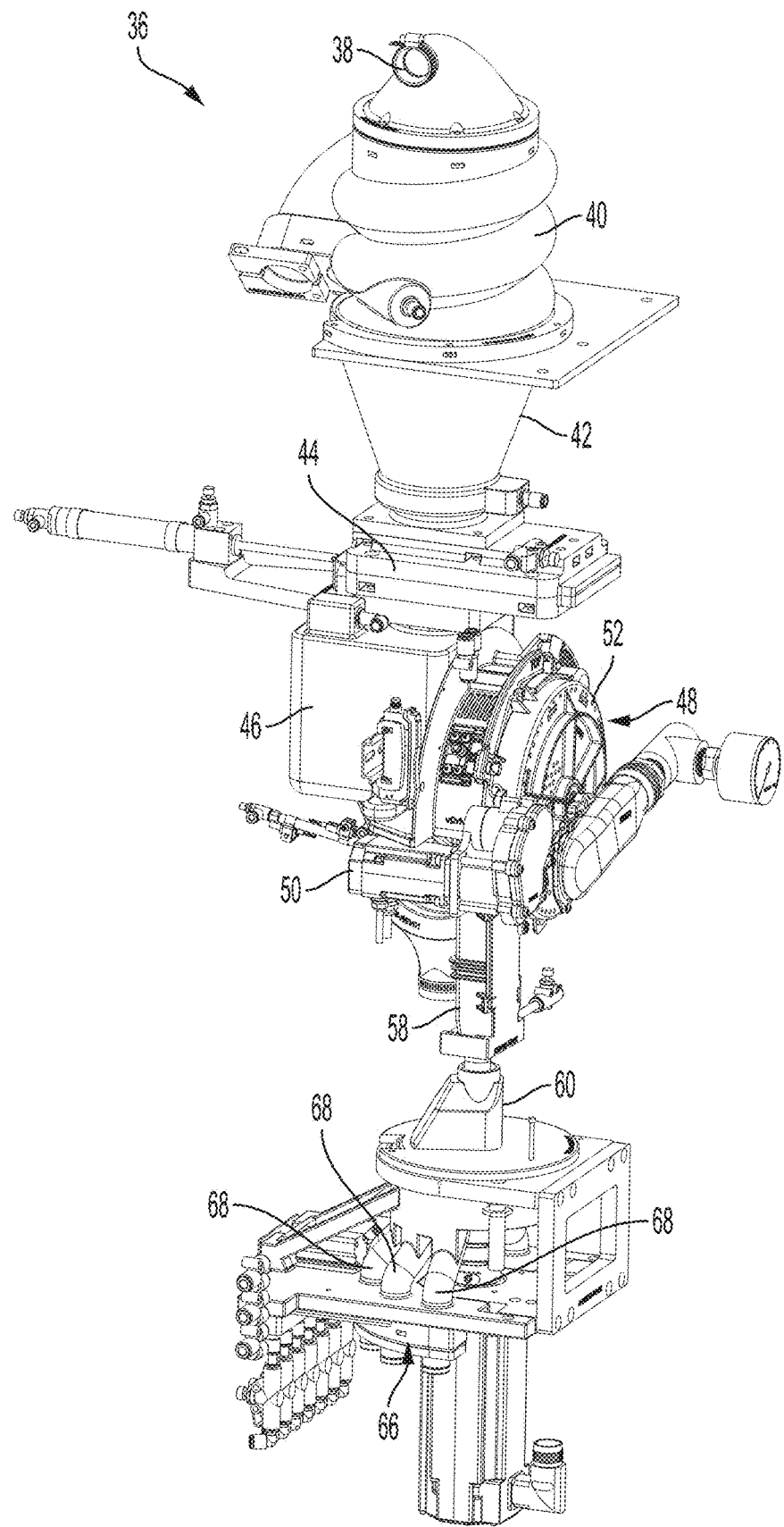
FIG. 5 is a perspective view of another part of the seed loading assembly of the system of FIG. 1, illustrating a seed singulation unit of the seed loading assembly.
Figure 6:
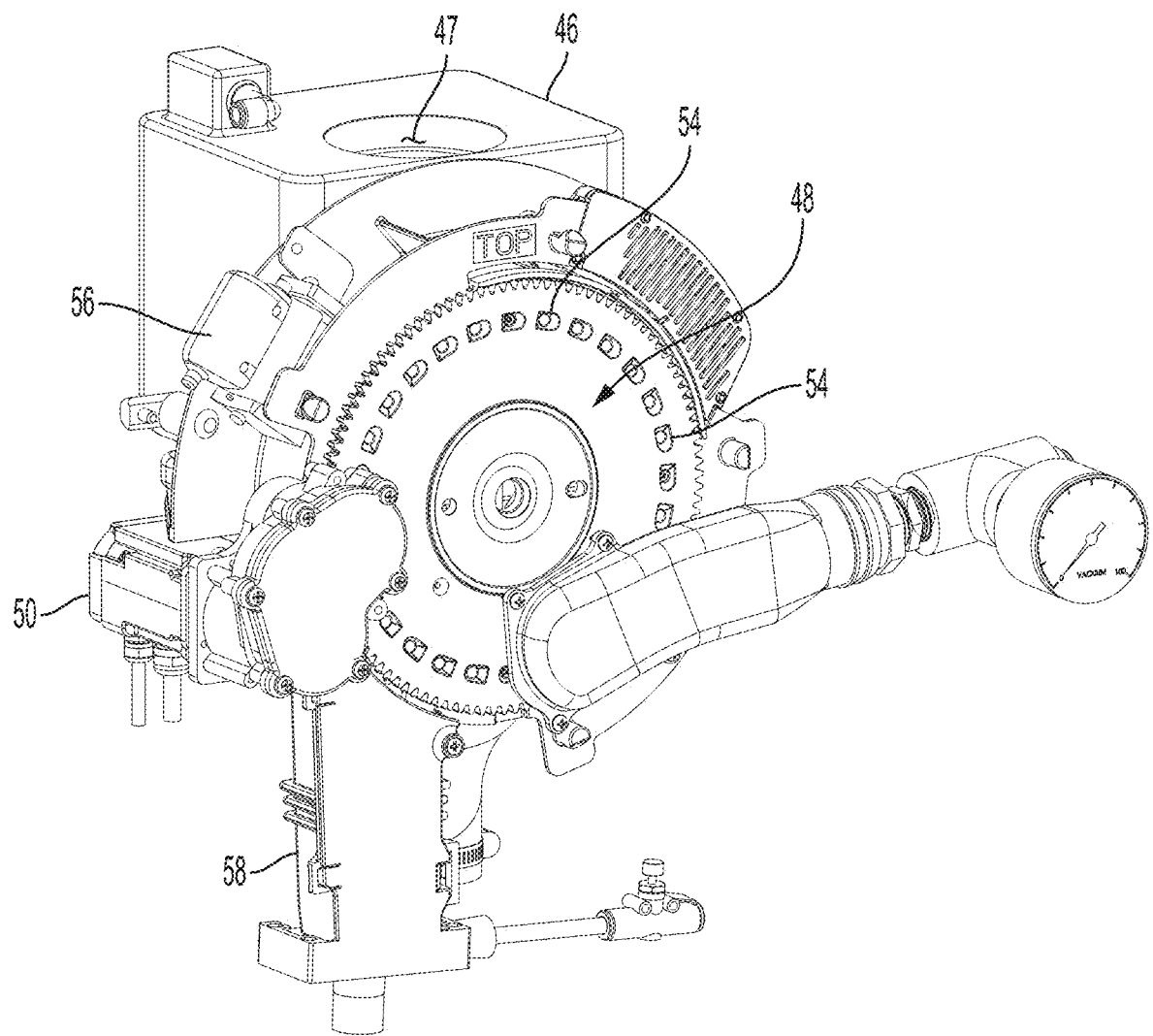
FIG. 6 is a perspective view of part of the seed singulation unit of FIG. 5, illustrating a hopper and a separating wheel thereof.
Figure 7:
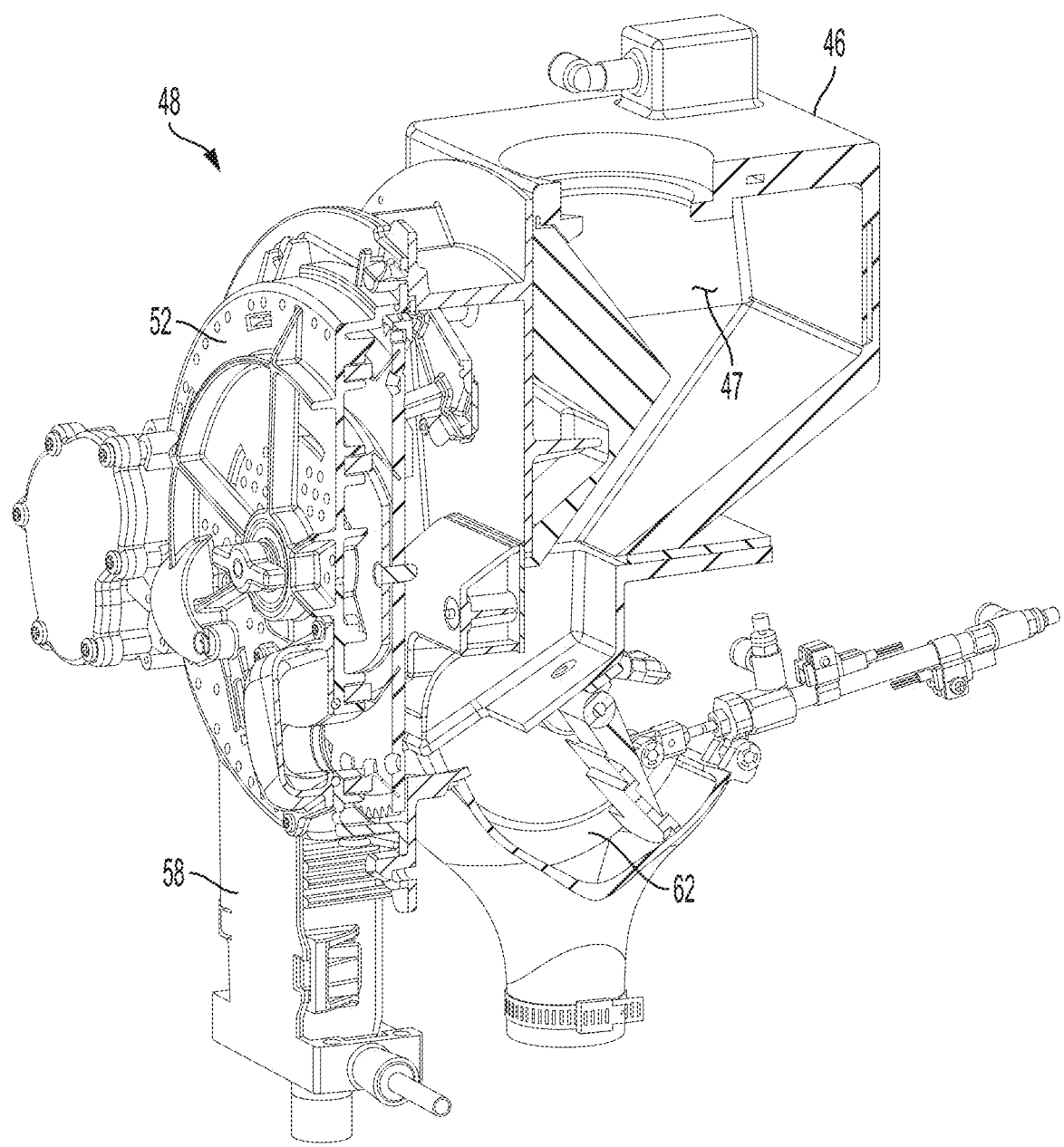
FIG. 7 is another perspective view of part of the seed singulation unit of FIG. 5, further illustrating the hopper and the separating wheel thereof.

With reference now to FIGS. 5-7, upon receipt of the seeds at the seed singulation unit 36 (via inlet 38), a speed of the seeds is initially slowed/reduced by a seed decelerator 40 (FIG. 5), and the seeds are then collected in a migration queue 42. Once all of the seeds from the given seed packet are collected in the migration queue 42, they are then released (via automated gate 44) to hopper 46. The hopper 46 defines, includes, etc. a reservoir 47 (FIGS. 6 and 7) for receiving and holding the seeds therein (e.g., all of the seeds from the migration queue for the given seed packet, etc.). A separating wheel 48 is then disposed at least partially in communication with the reservoir 47 of the hopper 46 (and particularly in communication with seeds in the reservoir 47). The separating wheel 48 is configured to rotate (via motor 50) relative to the hopper 46. And, as best shown in FIG. 6 (in which a cover 52 is removed from the separating wheel 48), apertures 54 of the separating wheel 48 (in conjunction with a vacuum source) are configured to capture individual seeds from the grouping of seeds in the hopper 46 and retain the seeds in the apertures as desired (via desired vacuum pressure, for example, based on the particular seeds received into the system per the given logistic data for the seeds (e.g., the vacuum pressure can be configured to specific values based on seed type, seed size, seed mass, etc.) and to potentially optimize seed pickup efficiency). A sensor 56 is disposed proximate to the separating wheel 48 to, for example, sense whether individual seeds are captured correctly in the individual apertures 54 (e.g., one seed in one aperture 54, etc.), count seeds as they enter the apertures 54 and/or move by the sensor 56 (e.g., as part of a quality control for monitoring the number of seeds entering the seed sampling system 10 and the number of seeds exiting the seed sampling system 10, etc.), combinations thereof, etc. In other example embodiments, seed sampling systems may include seed loading assemblies having separating wheels with different numbers and/or sizes of apertures therein. In addition, in still other example embodiments, seed sampling systems may include seed loading assemblies with singulation units that utilize features other than separating wheels to singulate seeds (e.g., vibratory separators, etc.). For instance, in other example embodiments, seed loading assemblies of the seed sampling systems may be configured to load one or more plates of individual seeds into or onto the systems. In connection therewith, the systems may additionally include queuing systems (or queuing features associated with the seed loading assemblies) having movement actuators (e.g., arms, etc.) that move one or more of the desired seeds from the plates to transfer tubes connected to the seed loading assemblies (whereby loading the seeds to the systems is substantially automated as well via the queuing systems, etc.).

In operation (and as part of a method of the present disclosure), the separating wheel 48 of the seed singulation unit 36 rotates (via the motor 50) to move the apertures 54 generally through the reservoir 47 of the hopper 46. As the separating wheel 48 rotates, suction is supplied to the apertures 54 (via the vacuum source) so that apertures 54 passing through and/or adjacent to the hopper reservoir 47 capture and hold individual seeds within the apertures 54. As the separating wheel 48 continues to rotate, it moves the apertures 54 and captured seeds out of, and generally away from, the hopper reservoir 47, past the sensor 56, and to a deposit compartment 58. In the deposit compartment 58, the captured seeds are dislodged from the apertures 54 (via reduced suction within the apertures 54 and/or via wipers (not shown)) and received (e.g., via gravity, vacuum pressure, etc.) in a transport chamber (not visible) extending to a diverter 60. The separating wheel 48 then continues to rotate, and eventually moves the emptied apertures 54 back to the hopper reservoir 47 to capture additional seeds from the hopper 46, as appropriate, for example, until all seeds from the given seed packet in the hopper 46 are transferred to the diverter 60, or until a desired number of seeds from the hopper 46 are transferred to the diverter 60, etc.

In the illustrated embodiment, the hopper 46 of the seed singulation unit 36 includes a dump gate 62 (FIG. 7). Upon completion of a seed project (i.e., upon singulation of all desired seeds from the seed project), if any seeds still remain in the hopper 46 (and are not able to be transferred to the diverter 60 or are not intended to be transferred to the diverter 60), the system 10 is configured to actuate the dump gate 62 (e.g., open the dump gate 62, etc.) so that the remaining seeds in the reservoir 47 of the hopper 46 can be removed and collected in a desired discard container (thereby preparing the hopper 46 to receive seeds from the queuing station 20 for another seed packet associated with another project). In connection therewith, other features such as pressurized air, etc. may be used within the hopper 46 to help ensure any remaining seeds are removed from the hopper 46 through the dump gate 62, and transported to the discard container.

With particular reference to FIG. 5, the diverter 60 of the seed singulation unit 36 is disposed generally below the separating wheel 48 (and below the deposit compartment 58). The diverter 60 is configured to receive the seeds dislodged from the separating wheel 48 and individually distribute each of the seeds to diverter manifold 66. In addition, the diverter 60 is configured to rotate between multiple different positions in alignment with one of multiple conduits 68 extending through the diverter manifold 66 to thereby transfer (e.g., via gravity, induced air flow, mechanical operation, etc.) individual seeds from the hopper 46 to the appropriate ones of the conduits 68 (e.g., thereby defining multiple individual seed paths for the singulated seeds moving forward through the system 10, etc.). For example, when the diverter 60 transfers an individual seed to one of the conduits 68, it then rotates into alignment with another one of the conduits 68 and transfers another individual seed thereto. This may be repeated until each of the conduits 68 in the manifold 66 receives an individual seed. In connection therewith, sensors (not shown) may be associated with the diverter 60 and/or the conduits 68 to, for example, sense received seeds in the diverter 60 and/or the conduits 68, count seeds as they enter the diverter 60 and/or conduits 68, count seeds as they exit the diverter 60 and/or conduits 68, combinations thereof, etc. In the illustrated seed sampling system 10, the diverter manifold 66 includes seven conduits 68 (although only three are visible in FIG. 5). And, of the seven conduits 68, six are configured to direct seeds to the sampling assembly 18, and one is configured to direct seeds to a discard container as desired or appropriate (e.g., excess seeds received by the diverter 60, particular seeds received by the diverter 60 based on data obtained by the sensor(s) for the seeds, etc.). However, it should be appreciated that the diverter manifold 66 may include other numbers of conduits in other embodiments (e.g., at least one, at least six, at least seven, at least eight, etc.), for example, based on a number of seed pathways to be defined by and/or included in the system 10 (and generally with at least one additional conduit for discarding seeds, as desired).

Figure 8:
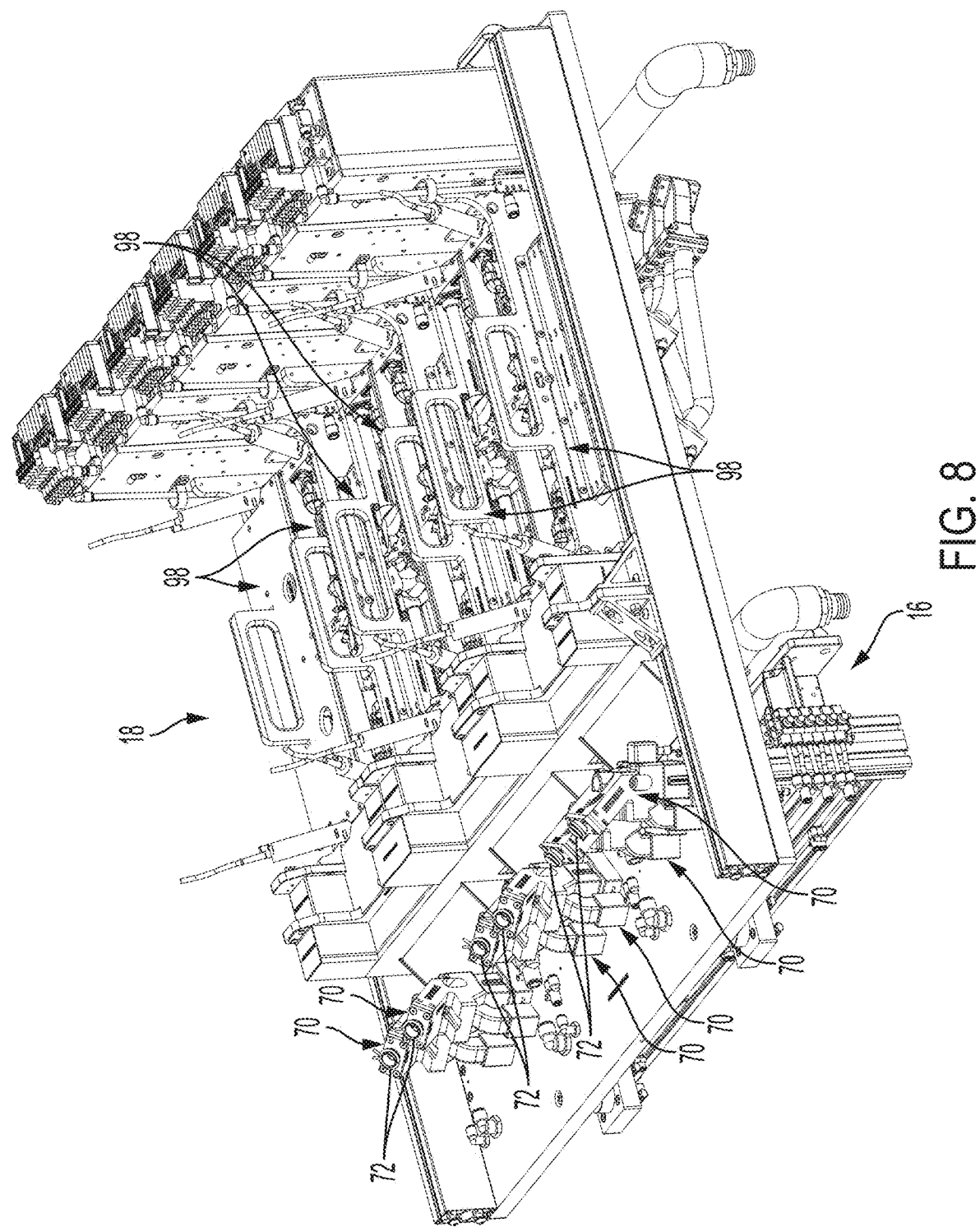
FIG. 8 is a perspective view of part of the seed loading assembly of the system of FIG. 1, together with a seed imaging assembly and a seed sampling assembly.
Figure 9:
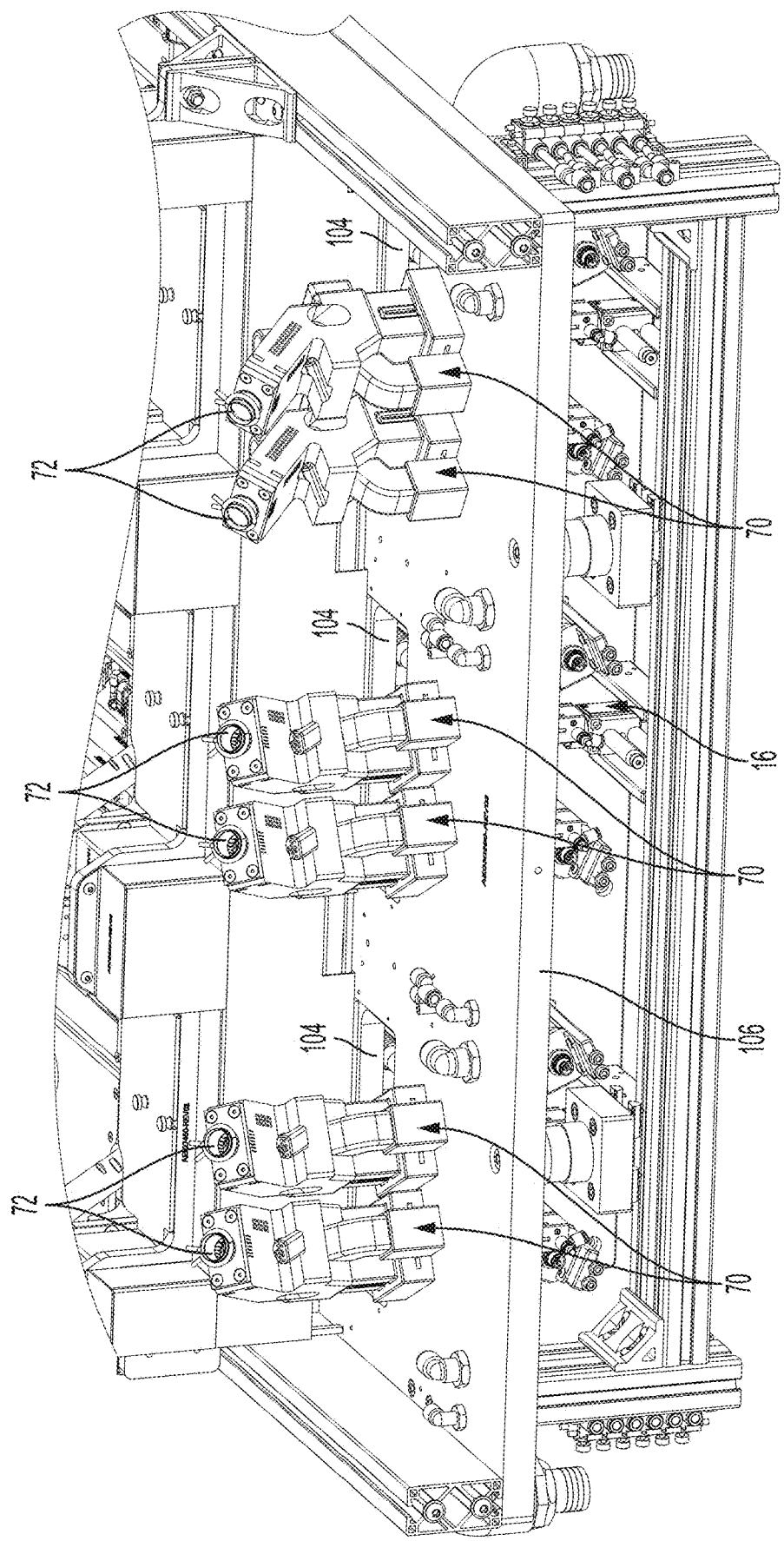
FIG. 9 is a fragmentary view of FIG. 8 further illustrating part of the seed loading assembly, together with the imaging assembly.
Figure 10:
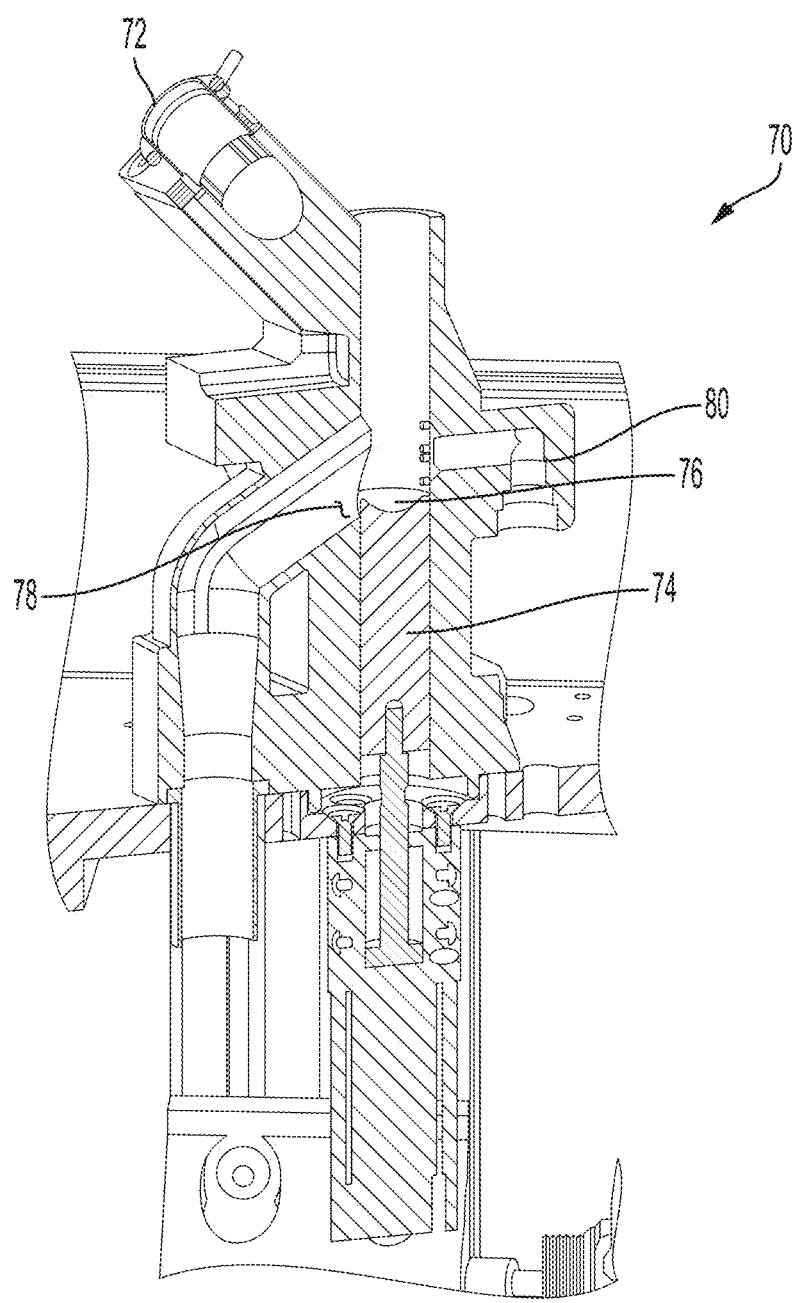
FIG. 10 is a fragmentary perspective view of an elevator unit of the seed loading assembly of FIG. 8.

As shown in FIGS. 8-10, the seed loading assembly 12 further includes multiple elevator units 70 (e.g., six elevator units 70 in the illustrated embodiment, etc.) for receiving the singulated seeds from the diverter manifold 66. The elevator units 70 are positioned generally below the seed singulation unit 36 (and thus generally below the diverter 60 and diverter manifold 66). Each one of the elevator units 70 is in communication with one of the conduits 68 of the diverter manifold 66 (e.g., via transport tubes (not shown) extending from the conduits 68 to inlets 72 of the elevator units 70, etc.). As such, singulated seeds from the manifold 66 can be transferred (e.g., via gravity, induced air flow, etc.) to the elevator units 70 for subsequent transfer to the seed transport assembly 14 (as part of the multiple individual seed paths for the singulated seeds in the system 10 (i.e., with each elevator unit forming part of each seed path)). In general, the singulated seeds are transferred from the diverter manifold 66 to the elevator units 70 when the elevator units 70 are empty and ready to receive the seeds (e.g., when prior seeds at the elevator units 70 have already been passed to the seed transport assembly 14, etc.). In connection therewith, the singulated seeds may be transferred from the diverter manifold 66 to the elevator units 70 one at a time (e.g., as one of the conduits 68 of the manifold 66 receives a seed from the diverter 60, it may immediately transfer the seed to a corresponding one of the elevator units 70, etc.). Or, the singulated seeds may be held in the diverter manifold 66 until all of the conduits 68 are filled with seeds, and then all of the seeds in the conduits 68 are transferred to corresponding ones of the elevator units 70 in sequence or at generally the same time.

As particularly shown in FIG. 10 (illustrating an example one of the elevator units 70), the elevator unit 70 includes a piston 74 moveable (e.g., via pneumatic operation, etc.) between a retracted position (as shown in FIG. 10) and an elevated position (generally above the retracted position). When in the elevated position (or when in the retracted position), the piston 74 can receive a seed from the diverter manifold 66 onto an end portion 76 of the piston 74 (via the inlet 72 and a corresponding channel (not visible) leading through the elevator unit 70 from the inlet 72 to the piston 74). The piston 74 is then configured to present the seed for transfer/hand-off to the seed transport assembly 14 (for subsequent transport to the seed imaging assembly 16 and the seed sampling assembly 18). In various embodiments, the end portion 76 of the piston 74 may include a suction cup (e.g., a vacuum cup as described herein after, etc.) for use in receiving and retaining a seed (e.g., via negative pressure suction applied thereto, for example, through the piston 74, etc.). However, as can be appreciated, this is not required in all implementations of the system 10.

Also in the elevator unit 70, the piston 74 can be actuated from the elevated position to the retracted position (again, as shown in FIG. 10) where the end portion 76 of the piston 74 is exposed to an outlet 78. The piston 74 may be actuated to the retracted position, for example, to expel a seed through the outlet 78 (e.g., via gravity, via compressed air source 80, via vacuum pressure, etc.) from the elevator unit 70 (e.g., to a remnant bin, another location, etc.) if hand-offs are missed to the seed transport assembly 14, or if multiple seeds are detected in the elevator unit 70 at a given time, or if a seed is detected (via a sensor at the elevator unit, for example) having one or more specific characteristics (e.g., undesirable characteristics, particular sizes, particular types, etc. based on intermediate analysis, etc.), etc. In connection therewith, sensors or other imaging devices may be associated with the elevator unit 70 to sense a seed received from the manifold 66, to count seeds as they enter the elevator unit, to evaluate a seed to be expelled from the elevator unit 70 (e.g., evaluate specific characteristics of the seed, etc.), and/or combinations thereof, etc. (e.g., as a last point or opportunity in a seed path to remove or expel a seed from the system 10, before the seed is sampled and processed and thereby impacts collection operations of the system 10; etc.). In addition, the piston 74 may be actuated to the retracted position for generally cleaning the elevator unit 70 after a seed is successfully transferred to the seed transport assembly 14 (e.g., via compressed air source 80, etc.), etc., for example, when determined to be necessary by one of the sensors.

With that said, it should be appreciated that the separating wheel 48 and the diverter 60 of the seed singulation unit 36, in connection with the conduits 68 of the diverter manifold 66, allow for singulation of individual seeds from the quantity of seeds originally received in the hopper 46 (in connection with the given seed packet). As such, the seed loading assembly 12 operates to provide individual seeds to the seed transport assembly 14 for subsequent transfer to the seed imaging assembly 16 and the seed sampling assembly 18 (such that single seed identity is generally logged and tracked in the system 10 from this point forward as part of the individual seed paths through the system 10). In addition, and as described above, sensors disposed in communication with one or more of the diverter 60, the diverter manifold 66 (and its conduits 68), and/or the elevator units 70 help further ensure that only one seed at a time is transferred from the seed loading assembly 12 (thus helping to facilitate the single seed identity feature of the system 10). What's more, via the sensors and/or imaging assemblies/units herein (which may be located (without limitation) at the separating wheel 48, the diverter 60, and the elevator units 70, and which may additionally include the other sensors and/or imaging assemblies/units described herein), other data relating to the seeds may be captured including, for example, infrared (IR) images, near-infrared (NIR) images, seed color, seed size, disease ratings, etc. Such data, then, may be used by the system 10 to augment upstream and/or downstream operations (e.g., sampling settings, process flow speeds, etc.) and/or to remove or expel particular ones of the seeds from the system (e.g., at the manifold 66 via the discard conduit 68, at the elevator units 70 via the outlets 78, etc.) for disposal, sorting, collection, etc., based on one or more related classifications or otherwise.

Figure 11:
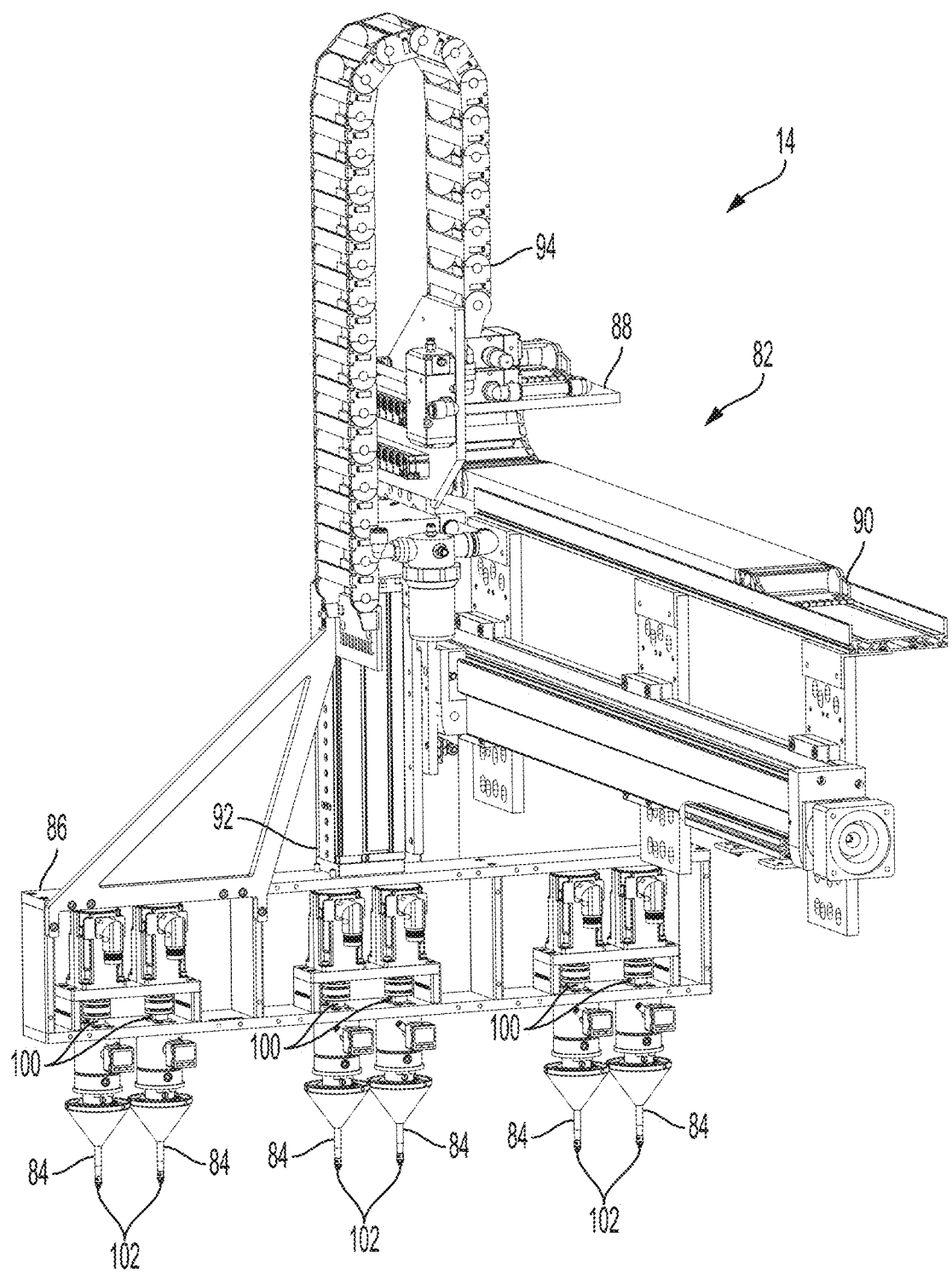
FIG. 11 is a perspective view of a seed transport assembly of the system of FIG. 1.

Referring now to FIG. 11, the seed transport assembly 14 of the seed sampling system 10 generally includes a translation mechanism 82 and multiple retention members 84 mounted in a transport 86 supported by the translation mechanism 82 (e.g., six retention members 84 in the illustrated embodiment, etc.). The illustrated translation mechanism 82 generally includes a first carrier 88 coupled to a guide 90, whereby the first carrier 88 is moveable (e.g., slidable via an actuator, via a motor drive unit, etc.) in a generally linear direction along the guide 90. The translation mechanism 82 also includes a second carrier 92 coupled to a drive 94 (e.g., to a belt drive, to a chain drive, etc.), whereby the second carrier 92 is moveable in a generally linear direction (generally perpendicular to the movement of the first carrier 88) via movement of the drive 94. In this manner, the translation mechanism 82 is configured to move the transport 86 and the retention members 84 in two directions relative to the seed loading assembly 12 (and particularly relative to the elevator units 70 thereof). For example, the seed transport assembly 14 is generally disposed above the elevator units 70 of the seed loading assembly 12, and also above the seed imaging assembly 16 and the seed sampling assembly 18 (also see, FIG. 3). In connection therewith, the first carrier 88 is configured to move the transport 86 generally horizontally in the system 10 (in a direction generally parallel with an alignment of the elevator units 70, imaging units 96 of the seed imaging assembly, and sampling modules 98 of the seed sampling assembly 18 (e.g., in an X-direction of the system 10 as indicated in FIG. 1, etc.)), and generally vertically (e.g., in a Z-direction of the system as indicated in FIG. 1, etc.).

The retention members 84 of the seed transport assembly 14 are extendable from the transport 86 (e.g., via pistons 100, etc.) and are configured to move angularly, as desired. This allows the retention members 84 to move as needed to retrieve (and capture) seeds from the elevator units 70 (e.g., even when the elevated seeds are not immediately vertically aligned with the retention members 84, etc.). What's more, the retention members 84 are also configured to rotate so that, once the seeds are retrieved from the elevator units 70, the retention members 84 can operate to orient the seeds in desired orientations, positions, etc. In connection therewith, the retention members 84 include end portions 102 configured to retain, hold, etc. the seeds received from the elevator units 70. In the illustrated embodiment, the end portions 102 include suction cups (e.g., vacuum cups, etc.) for use in receiving and retaining the seeds (e.g., via negative pressure suction, etc.). The suction cups may include cup-shaped end portions, defining, for example, V-shapes, U-shapes, other shapes, etc. conducive to holding seeds The suction cups are configured such that when negative air pressure is supplied to the suction cups (via suitable means), seeds can be engaged and retained thereby (with one seed received in one suction cup). Then, when the seeds are effectively transferred by the retention members 84 to the sampling assembly 18 and the end portions 102 thereof release the seeds, positive air pressure may be supplied to the suction cups (at the end portions 102) (again via suitable means) to generally clean out the end portions 102 and help inhibit any buildup and help improve seed pickup efficiency. In other example embodiments, seed sampling systems may include seed transport assemblies having retention members with end portions defining other than suction cups for use in receiving and retaining seeds, for example, mechanical holders, seed gripping mechanisms, etc.

In operation of the seed transport assembly 14 (when the elevator units 70 of the seed loading assembly 12 move seeds to the elevated positions), the first carrier 88 is configured to position the transport 86 generally over the elevator units 70, and the second carrier 92 is then configured to move the retention members 84 into position immediately above the pistons 74 thereof (such that each one of the retention members 84 is located above a corresponding one of the elevator units 70). In turn, the retention members 84 (specifically, the end portions 102 of the retention members 84) are configured to then engage and receive the seeds from the elevator units 70. As described above, this may involve actuating the retention members 84 as necessary to allow the end portions 102 thereof to properly engage the seeds (e.g., extending the retention members 84 relative to the transport 86 toward the seeds, moving the retention members 84 angularly relative to the transport 86, etc.). And, once the seeds are engaged (and captured), the second carrier 92 of the seed transport assembly 14 is configured to raise the transport 86 (and the captured seeds) and the first carrier 88 is configured to move the seeds to the seed imaging assembly 16, as described next.

Figure 12:
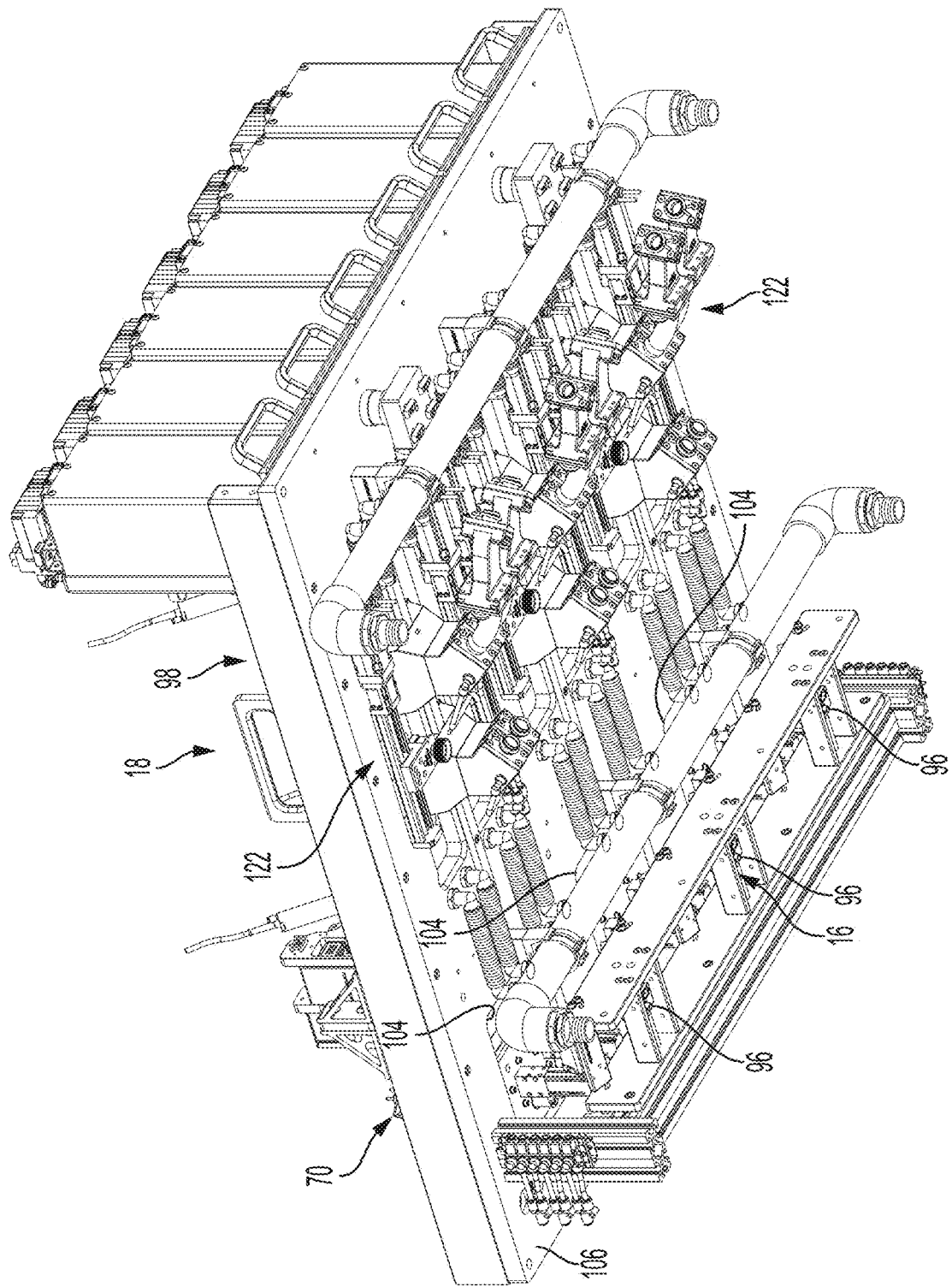
FIG. 12 is a perspective view of part of the seed loading assembly of the system of FIG. 1, together with the seed imaging assembly and the seed sampling assembly.

The seed imaging assembly 16 of the seed sampling system 10 is shown in FIG. 12, and is structured and operable to image each of the seeds captured by the seed transport assembly 14. In particular, the seed imaging assembly 16 is configured to collect at least one image of each of the seeds held in the retention members 84 of the seed transport assembly 14 (when the seed transport assembly 14 moves the seeds to the seed imaging assembly 16). The images collected of the seeds at the seed imaging assembly 16 can be any desired type of images. For example, the images may be visual images (color and/or black and white), IR images (associated with the IR band) (e.g., to "see" haploid seeds, etc.), NIR images or NMR/MRI images, or any other type images or related spectral data. What's more, the images may include two-dimensional images (through which two-dimensional (2-D) seed metrics of each of the seeds may then be gathered, including (without limitation) cap/tip location, seed area, seed shape, disease, etc.), or the images may include three-dimensional (3-D) images derived with from multiple 2-D images, or leveraging a laser profiler, or any combination of techniques to derive a 3-D measurement.

Once the images are collected, they are communicated to the control system for storage in the associated data structure and processing as described herein. For example, the images may be used to determine orientations of the seeds at the retention members 84, and to direct operation of the retention members 84 to rotate and orient the seeds in desired positions prior to sampling operations. In connection therewith, for instance, the images may be used to locate embryos of the seeds so that the seeds can be oriented (by the retention members) in a desired position whereby when the seeds are delivered to the sampling assembly 18 the samples can be removed from the seeds without damaging the embryos. Also for example, the images may be used to help analyze the seeds in connection with any tissue analysis performed on tissue samples removed from the seeds when sampling operations are performed, for example, for use in single-seed phenotyping (e.g., to determine seed volume and/or seed shape, to identify disease, to identify non-viable seed material, etc.) and/or as part of a quality control program to monitor operation of the seed sampling system 10 (e.g., to help adjust (e.g., speed up, slow down, etc.) various processes of the system 10 (e.g., processes of the seed loading assembly 12, the seed transport assembly 14, the seed sampling assembly 18, etc.) without interrupting the processes, etc.). Further, for example, the images may be used to direct operation of the seed sampling assembly 18 in removing tissue from the seeds (e.g., direct operation of the seed sampling assembly 18, etc.).

In the illustrated embodiment, the seed imaging assembly 16 includes multiple imaging units 96 positioned generally below the elevator units 70 and generally between the elevator units 70 and the sampling modules 98 of the seed sampling assembly 18 (also see FIG. 8). The imaging units 96 are generally aligned with openings 104 in a floor 106 of the seed sampling system 10 to allow access by the imaging units 96 to the seeds held at the retention members 84 of the seed transport assembly 14. With that said, the imaging units 96 may include, for example, cameras, etc. capable of capturing images of the types described above (and/or suited for the particular imaging application of the system 10). In addition, in some embodiments the seed imaging assembly 16 may also include (e.g., as part of the imaging units 96 or in combination therewith, etc.) one or more light sources disposed for illuminating the field of view of the imaging units 96 as needed (although such light sources are not required in all embodiments). When present, the one or more light sources may include any type of light source suited for the particular imaging application of the system 10 (e.g., incandescent lights, fluorescent lights, ultraviolet lights, infrared (IR) lights, light emitting diodes (LEDs), etc.). With that said, the illustrated system 10 includes three imaging units 96, with each imaging unit configured to image seeds in connection with two adjacent seed paths of the system 10. It should be appreciated, however, that the system 10 may include other numbers of imaging units in other embodiments (e.g., depending on the number of seed paths in the system 10, etc.), and/or that the system 10 may include one imaging unit for each seed path.

In operation of the seed imaging assembly 16, the first carrier 88 of the seed transport assembly 14 is configured to move the transport 86 (and captured seeds) from the elevator units 70 to a position over the seed imaging assembly 16 (in the X-direction of the system 10), such that a field of view of each of the imaging units 96 (through the openings 104) includes at least a bottom portion of at least one of the seeds captured in the seed transport assembly 14 (and, more specifically in the illustrated embodiment, two adjacent seeds, such that two adjacent seeds are within the field of view of each of the imaging units 96 with the imaging units 96 then each capturing one or more images of two seeds). The second carrier 92 of the seed transport assembly 14 is then configured to lower the transport 86 and the seeds toward the imaging units 96 (in the Z-direction of the system 10), where the imaging units 96 capture one or more images of the seeds. In various embodiments, the second carrier 92 may be configured to lower the transport 86 such that the seeds move through the openings 104 of the floor 106 and into positions adjacent the imaging units 96 (such that the imaging units 96 are configured to collect images of multiple portions of the seeds, for example, as the seeds are lowered (thereby collecting images of bottom portions of the seeds) and after the seeds are positioned adjacent the imaging units 96 (thereby collecting images of side portions of the seeds)). Once the desired images are collected, the seed transport assembly 14 is configured to raise the seeds (via the second carrier 92) and move the seeds (via the first carrier 88) to the seed sampling assembly 18 (again in the X-direction of the system 10). In other embodiments, the seed transport assembly 14 may simply move the captured seeds from the elevator units 70 to a position over the seed imaging assembly 16 (in the X-direction of the system 10), where the imaging units 96 then capture one or more images of the seeds as described above (without the seed transport assembly 14 also lowering the seeds toward the imaging units 96).

Then, based on the image data for the seeds collected at the seed imaging assembly 16 (as evaluated by the control system, for example), the retention members 84 are configured to rotate the seeds to desired orientations prior to presenting the seeds to the seed sampling assembly 18 for sampling. In particular, for example, in the illustrated embodiment the seeds may be orientated by the retention members 84 so as to avoid embryos of the seeds during sampling operation in order to maintain seed viability. Alternatively, in various other embodiments, the seeds may be oriented to actually target the embryos or to target particular portions of the seeds during the sampling operation. In any case, the seeds may be oriented to the desired orientations based on desired or detectable genotypes, native or non-native traits, phenotypes, etc. including, for example, but not limited to, seed oil content, moisture content, color, geometry, geometry classification such as flat or round, or process outcome, etc. As an example, seeds may be oriented by the retention members 84 so that a cap or particular side of the seed is ultimately presented to the sampling assembly 16 for sampling (e.g., to a sampler 114 thereof, etc.).

With reference to FIGS. 13-16, the seed sampling assembly 18 of the seed sampling system 10 includes multiple sampling modules 98 (e.g., six sampling modules 98 in the illustrated embodiment, etc.). And, each of the sampling modules 98 includes two sampling locations 108, 110 for use in removing tissue from seeds when the seeds are presented to the sampling modules 98 by the seed transport assembly 14 (for performing the sampling operation). In this way, each of the sampling modules 98 is able to accommodate parallel sampling and cleaning operations (potentially aiding in throughput of the system 10), i.e., for each one of the sampling modules 98, one seed may be sampled at a first sampling location 108 of the sampling module 98 while a second sampling location 110 is cleaned (e.g., at about the same time, etc.), as described in more detail hereinafter. What's more, each of the sampling modules 98 is configured, via a calibration process, to determine relative locations of the retention members 84 of the seed transport assembly 14 to help facilitate accurate transfer of seeds from the retention members 84 to the active sampling locations 108, 110 of the sampling modules 98 (this will be described in more detail hereinafter). While the illustrated embodiment includes six sampling modules 98, it should be appreciated that embodiments of the system 10 may include any desired number of sampling modules within the scope of the present disclosure (e.g., at least one, at least six, six or more, etc.), whereby the number of sampling modules may generally correspond to a number of seed paths in/through the system 10, etc.

Figure 14:
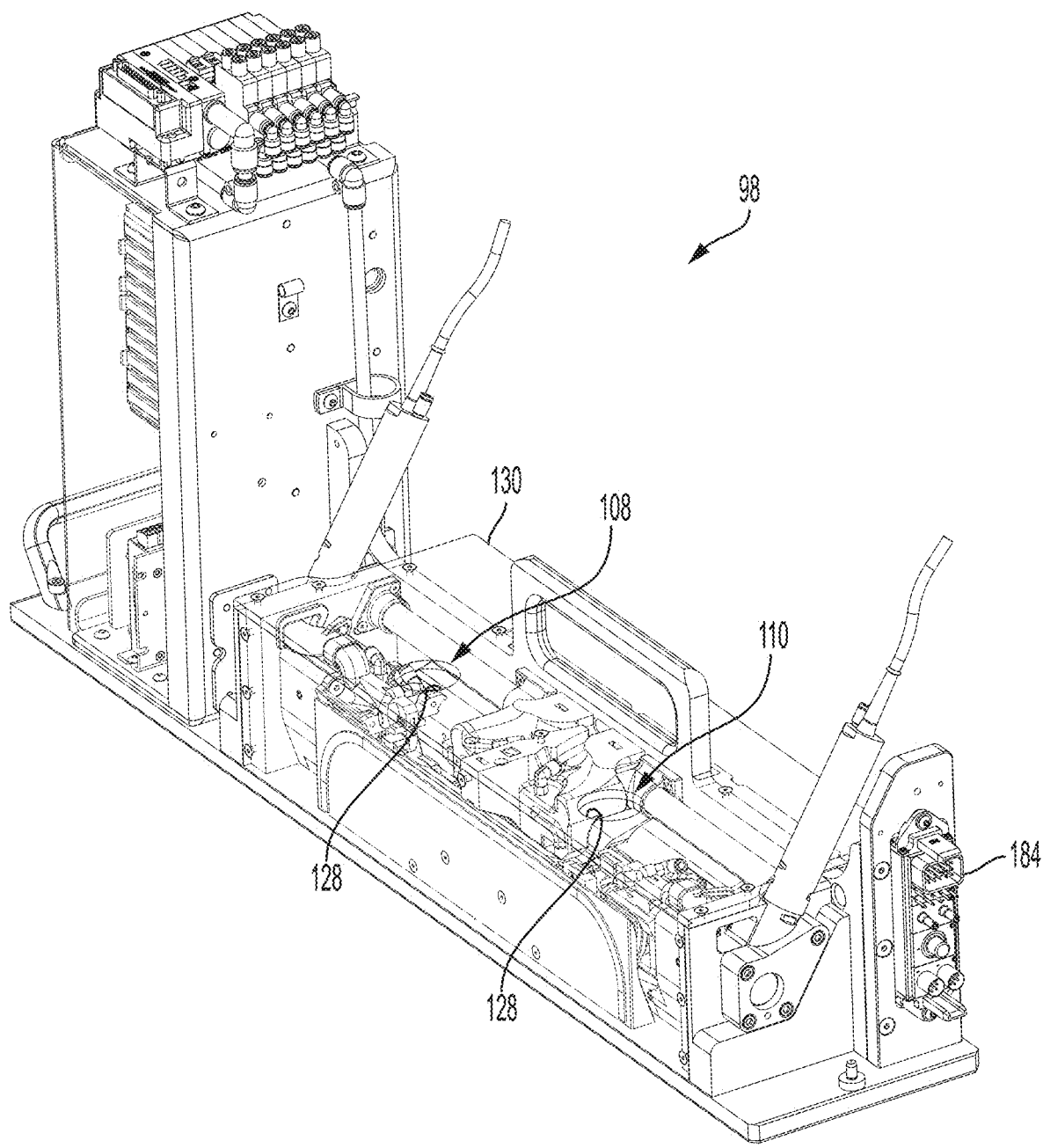
FIG. 14 is a perspective view of an example sampling module of the seed sampling of the system of FIG. 1.
Figure 15:
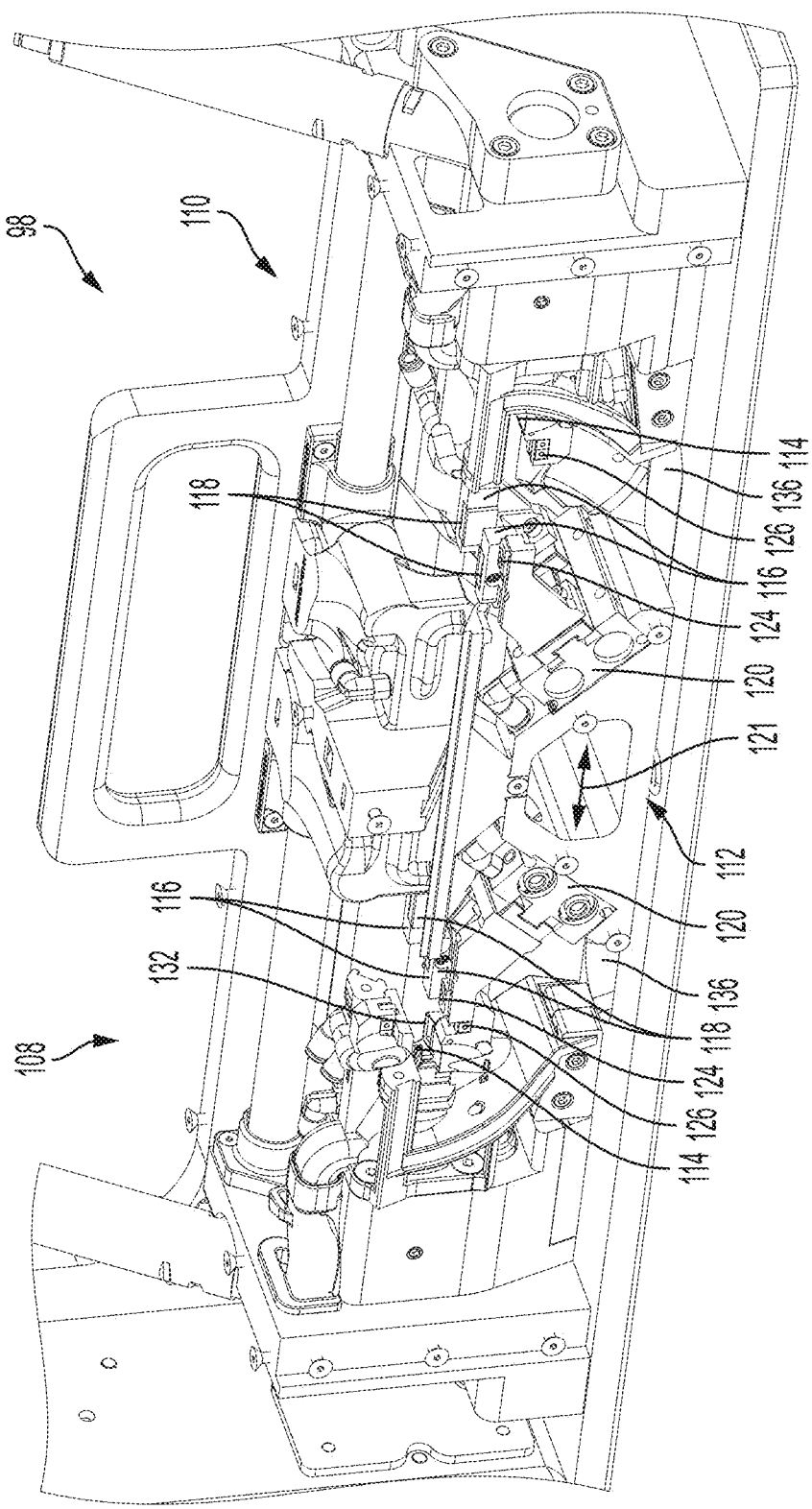
FIG. 15 is a fragmentary perspective view of the sampling module of FIG. 14, with an outer casing of the sampling module removed.
Figure 16:
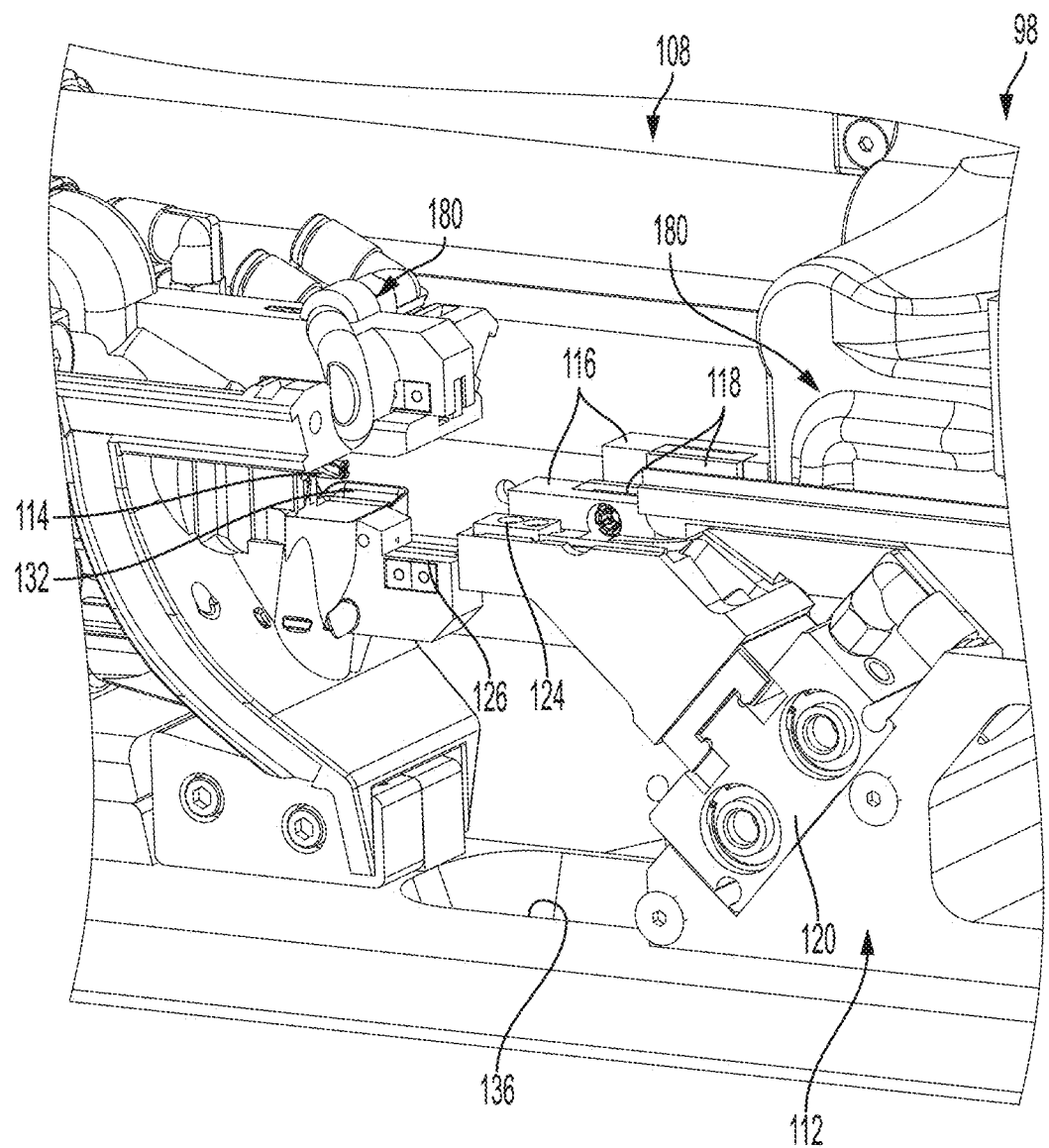
FIG. 16 is an enlarged fragmentary perspective view of the sampling module of FIG. 15.

With particular reference to FIGS. 14-16, one of the sampling modules 98 will be described next, with it understood that a description of the other sampling modules 98 is substantially the same. The illustrated sampling module 98 generally includes a central seed grip assembly 112 configured to hold a seed in the sampling module 98 at one of the sampling locations 108, 110 (depending on which of the sampling locations 108, 110 is active for sampling), and samplers 114 for removing tissue from the seed being held at the particular one of the sampling locations 108, 110 (as part of the sampling operation of the sampling module 98). In connection therewith, at each of the sampling locations 108, 110, the seed grip assembly 112 includes a pair of generally opposing arms 116 and corresponding pads 118 for securing/holding a seed therebetween. An actuator 120 (e.g., a pneumatic clamp, etc.) is provided to bidirectionally move each of the respective of arms 116 and corresponding pads 118 toward and away from each other, to thereby facilitate the securing/holding of the seed (and subsequent release thereof). In some embodiments, both pairs of arms 116 of the seed grip assembly 112 (at both of the sampling locations 108, 110) may move together (such that both pairs of arms 116 are either open or closed); while in other embodiments the arms 116 of the seed grip assembly at the first sampling location 108 are independently moveable from the arms 116 at the second sampling location 110. In addition, in some embodiments the pads 118 of the seed grip assembly 112 are removable from the arms 116 so that replacement pads may be installed to the arms 116 and/or so that different pads may be installed to the arms 116 to accommodate different types of seeds, etc.

The seed grip assembly 112 of the sampling module 98 is also moveable within the sampling module 98 in a direction indicated by arrow 121 in FIG. 15 (e.g., generally in the X-direction of the system 10, etc.), via actuator 122 (see, FIG. 12) (e.g., via a stepper motor, etc.). As such, when a seed is held between a pair of the arms 116 of the seed grip assembly 112, the seed grip assembly 112 is able to move the seed toward the sampler 114 associated with the particular one of the sampling locations 108, 110 to be used for sampling operation. This allows the sampling module 98 to control a sampling feed rate of the seed toward the corresponding sampler 114 (based on the movement (e.g., speed, etc.) of the seed grip assembly 112), as well as a sampling depth of the tissue removed from the seed (based on a distance moved by the seed grip assembly 112). As should be appreciated, these features can be independently controlled for each of the sampling modules 98 in the seed sampling assembly 18 (as well as for each of the samplers 114 at the different sampling locations 108, 110 at each of the sampling modules 98) to thereby tailor sampling operation in the system 10 to each sampling module 98 and each seed.

As indicated above, the sampling module 98 includes the two samplers 114, with one of the samplers 114 located at each of the sampling locations 108, 110 (for removing tissue from a seed held in the grip assembly 112 at the corresponding one of the sampling locations 108, 110). In the illustrated embodiment, each of the samplers 114 includes a drill (e.g., a high speed drill with controllable rotations per minute, etc.) and associated drill bit (with the two drill bits oriented along a common longitudinal axis, for example, in the illustrated embodiment). In some embodiments, the samplers 114 are each configurable for different types of seeds and/or for removing different types and/or sizes of tissue samples from seeds. For example, tissue sample sizes of down to 4.5 mg may be achieved (e.g., depending on seed type, depending on sample analysis requirements, etc.). With that said, in other embodiments, the sampling module 98 may include other samplers for removing tissue from seeds (other than drills and drill bits), including, for example, cutting wheels, broaches, knives, lasers, etc. What's more, in some embodiments, the sampling module 98 may include a different type of sampler at each of the sampling locations 108, 110 (e.g., a drill at the first sampling location 108 and a cutting wheel at the second sampling location 110, etc.) and/or a different type of sampler at each of the sampling modules 98, etc.

As shown in FIGS. 15 and 16, the sampling module 98 further includes, at each of the sampling locations 108, 110, first and second sensors 124, 126. As will be described next in connection with operation of the seed sampler assembly 18, the sensors 124, 126 help facilitate, control, monitor, etc. receipt of seeds to the sampling module 98 from the seed transport assembly 14, as well as movement of the seed grip assembly 112 relative to the samplers 114, at each of the sampling locations 108, 110 (depending on which of the sampling locations 108, 110 is active for sampling), in connection with sampling operation of the sampling module 98.

In particular, for example (and as generally described above), each of the sensors 124, 126 of the sampling module 98 is configured, via a calibration process, to determine relative locations of the seed grip assembly 112 (and its arms 116) and the retention members 84 of the seed transport assembly 14 to help facilitate accurate transfer of a seed from a given retention member 84 to the selected sampling location 108, 110 of the sampling module 98. In addition, once a seed is positioned in the seed grip assembly 112, each of the sensors 124, 126 is configured, via the calibration process, to further determine relative locations of the seed grip assembly 112 (and the seed held therein) and corresponding one of the samplers 114 to facilitate accurate removal of tissue from the seed. As such (and potentially further based on the image data collected for the given seed at the seed imaging assembly 16), the particular type of seed being sampled may be identified (whereby the system 10 is able to accommodate different types of seeds and control operation of the grip assembly 112 and sampler 114 to accommodate the particular different types of seeds as appropriate) and a desired size and/or shape of tissue sample may be removed from the seed by the selected sampler 114. It should thus be appreciated that the seed sampling system 10 may accommodate different types of seeds and/or adjust the size/shape of a tissue sample by controlling each of the samplers 114 in each of the sampling modules 98 independently or by controlling any two or more of the samplers 114 uniformly (e.g., by adjusting a rotation per minute (RPM) of the samplers 114, by changing an RPM of the samplers 114 during actual sampling operation, by modifying a rate at which seeds are fed to the samplers 114, etc.), and/or by modifying/adjusting a location of where a seed is grasped by the given seed grip assembly 112 (e.g., where the seed is located between the arms 116, etc.), and/or by modifying/adjusting a grip pressure applied by the arms 116 to the seeds at the seed grip assembly 112, etc.

In operation of the seed sampling assembly 18, after image data is collected by the seed imaging assembly 16 for the seeds held in the seed transport assembly 14 and after the seeds are oriented (or at about the same time or prior thereto), the seed transport assembly 14 is configured to move the seeds to the seed sampling assembly 18 (again, in the X-direction of the system 10). In so doing, the first carrier 88 is configured to position the transport 86 over the sampling modules 98, and the second carrier 92 is configured to lower the transport 86 (and the retention members 84) to position the seeds into the sampling modules 98 (e.g., through corresponding openings 128 of casings 130 of the sampling modules 98, etc.). In particular, the seed transport assembly 14 is configured to position the seeds at specific ones of the sampling locations 108, 110 of the sampling modules 98 (i.e., the ones of the sampling locations 108, 110 active for sampling operation), and at heights therein (through the corresponding ones of the openings 128) generally corresponding to the arms 116 and/or the samplers 114 (as determined by one or more of the sensors 124, 126, etc.). Then, the first sensors 124 of the seed grip assemblies 112 inspect, determine, identify, etc. outer extents of the seeds (e.g., in relation to the actuators 120 of the given seed grip assemblies 112, etc.) and, based thereon, the seed grip assemblies 112 are configured to move, as needed, to locate the seeds at a desired location between their arms 116 (and corresponding pads 118) (e.g., the seed grip assemblies 112 move from a starting location to a seed capture location, etc.). For example, if the seeds are oriented by the seed transport assembly 14 to a cap location, the first sensors 124 may then locate the caps of the seeds, so that the grip assemblies 112 hold the seeds at the desired locations and orientations with respect to the gripping surfaces of the pads 118 (e.g., with the caps of the seeds protruding from the gripper pads 118 (e.g., about one millimeter, etc.), etc.). The seed grip assemblies 112 are configured to then actuate their arms 116 together to grasp the seeds therebetween. And, in turn, the retention members 84 are configured to release the seeds (e.g., terminate any negative pressure suction applied thereto, etc.), and the seed transport assembly 14 returns to the elevator units 70 to capture additional seeds. It should again be appreciated that the image data collected by the seed imaging assembly 16 (and/or by any other imaging and/or sensing devices herein) may be used at the seed sampling assembly 18 (e.g., in combination with the sensors 124, 126; etc.) to help position the seeds at the correct heights, etc., individually, between the arms 116 of the seed grip assemblies 112 thereby controlling the exact locations of tissue removal for the seeds (and, potentially, to determine seed location prior to seed transfer to the grip assemblies 112, and to determine positions of the samplers 114).

Figure 17:
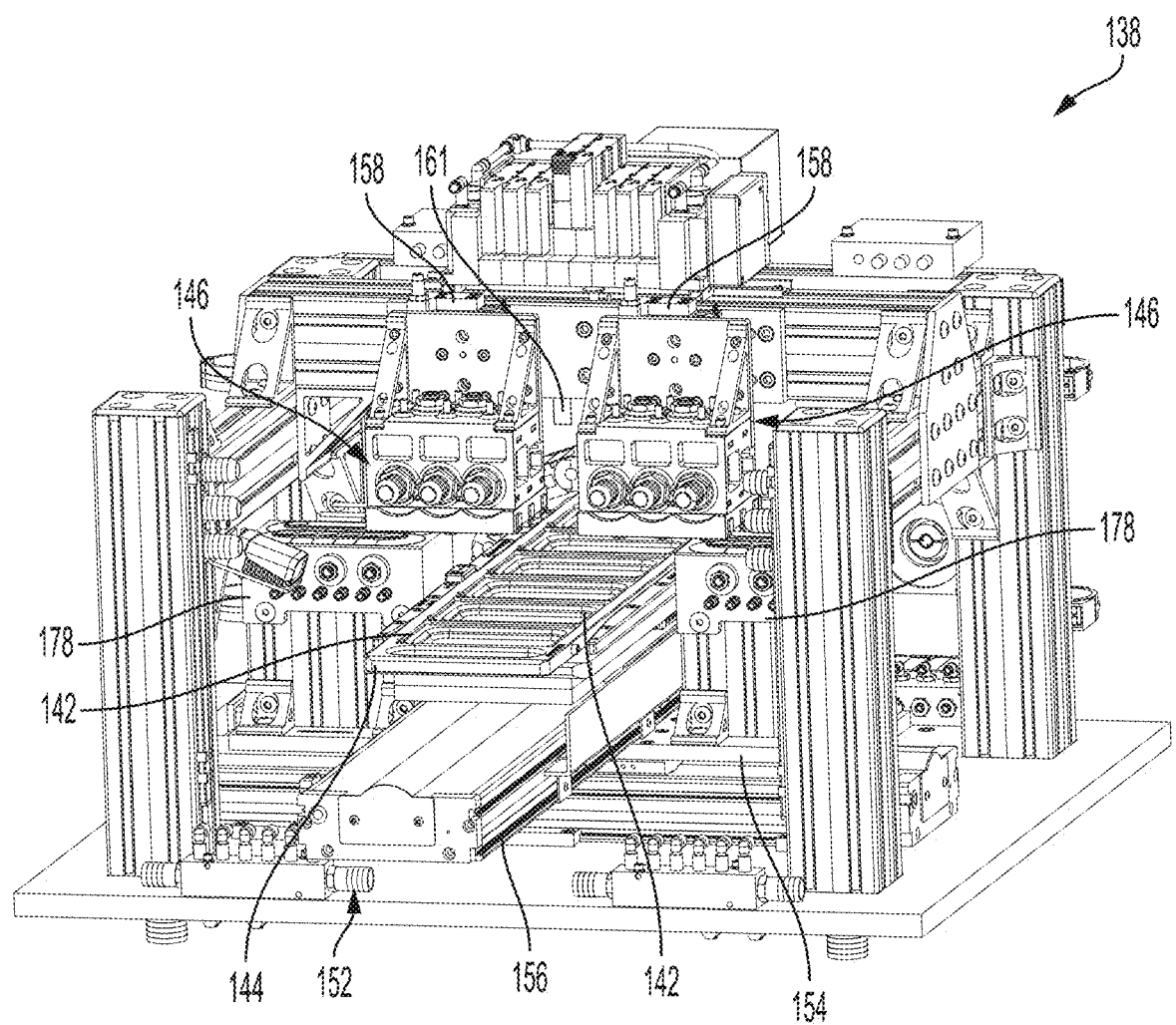
FIG. 17 is a perspective view of a sample collection assembly of the system of FIG. 1.

With particular reference again to the example sampling module 98 illustrated in FIGS. 15-17, when a seed is positioned at the first sampling location 108 between the arms 116 in the grip assembly 112, for example, negative pressure is established in a sample collection funnel 132 (e.g., vacuum pressure, etc.) in preparation for sampling, and the grip assembly 112 moves the seed toward the corresponding sampler 114. In so doing, the second sensor 126 identifies a leading edge of the seed and captures a location of the seed edge relative to the sampler 114 (e.g., based on the movement of the grip assembly 112 and a calibrated location of the sampler 114 and the grip assembly 112, etc.). In conjunction therewith, the grip assembly 112 moves toward the sampler 114 until the desired sample depth of the seed is achieved (and, potentially, a desired tissue amount, size, etc. is removed). In other embodiments, the sampler 114 may instead (or additionally) move toward the seed held in the grip assembly 112 until the desired sample depth of the seed is achieved. For example, the sampler 114 may be moveable within the sampling module 98 generally in the X-direction of the system 10, etc., via an actuator (such as actuator 122) (e.g., via a stepper motor, etc.). And, the removed tissue is drawn to the sample collection funnel 132 via the negative pressure air flow. The grip assembly 112 then moves back to its starting location, and the arms 116 release the seed to a seed collection funnel 134 (see, FIG. 13) via opening 136. As indicated above, each of the sampling modules 98 includes corresponding components for facilitating sampling operations at each of the sampling locations 108, 110. As such, each of the sampling locations 108, 110 of the sampling modules includes similar sample collection funnels 132 and seed collection funnels 134 (and corresponding openings 136) operable in the manner described above. With that said, in various embodiments, the system 10 may further include one or more sensors and/or imaging assemblies/devices associated with collection of the removed tissue from the seed (e.g., as the removed tissue is drawn into the seed collection funnel 134, at the seed collection funnel 134, downstream of the seed collection funnel 123, etc.) and configured to measure and/or otherwise quantify an amount of the tissue removed from the seed. In this manner, such data may provide control input to the depth settings of the sampler 114 and grip assembly 112 during sampling operation to help ensure that an exact quantity of tissue is removed from the given seed.

In the illustrated embodiment (and as introduced above), the sampling modules 98 of the seed sampling assembly 18 are configured to remove the tissue from the seeds in a non-destructive manner such that germination viability of the seeds can be preserved. This is described in more detail hereinafter.

Referring now to FIGS. 17-20, the tissue removed from the seeds at the sampling modules 98 is captured (via the sample collection funnels 132) and transported (e.g., via gravity, air pressure, air jets, etc.) to a sample collection assembly 138 of the seed sampling system 10. Similarly, the seeds from which the tissue is removed are captured (via the seed collection funnels 134) and transported (e.g., via gravity, air pressure, air jets, etc.) to a seed collection assembly 140 of the seed sampling system 10. In connection therewith, the tissue samples are collected in sample plates 142 at the sample collection assembly 138 (e.g., in specific wells of the plates 142, etc.), and the seeds are collected in seed trays (not shown) at the seed collection assembly 140 (e.g., in specific wells of the seed trays, etc.) so that a known relationship exists between each of the particular seeds and the tissue removed therefrom. For example, one or more identifiers may be assigned to the seeds and/or the tissue samples removed therefrom. As such, the seeds and the tissue samples taken from the seeds may be subsequently correlated. Further, through the identifiers, the various data captured by the system 10 for the given seeds (e.g., the various image data, etc.), as well as subsequent tissue analysis data, may be associated with the proper ones of the seeds, for example, at the control system, etc. With that said, and as will be appreciated from the following description, the sample collection assembly 138 and the seed collection assembly 140 both include corresponding sample collection components and seed collection components for each of the sample locations 108, 110 of each of the sampling modules 98 in the system 10. As such, the tissue removed from the seeds at the sampling modules 98, and the corresponding seeds, can be collected while continuing to maintain single seed identity (including identity of the corresponding sample removed from the seed) in the system 10.

Figure 18:
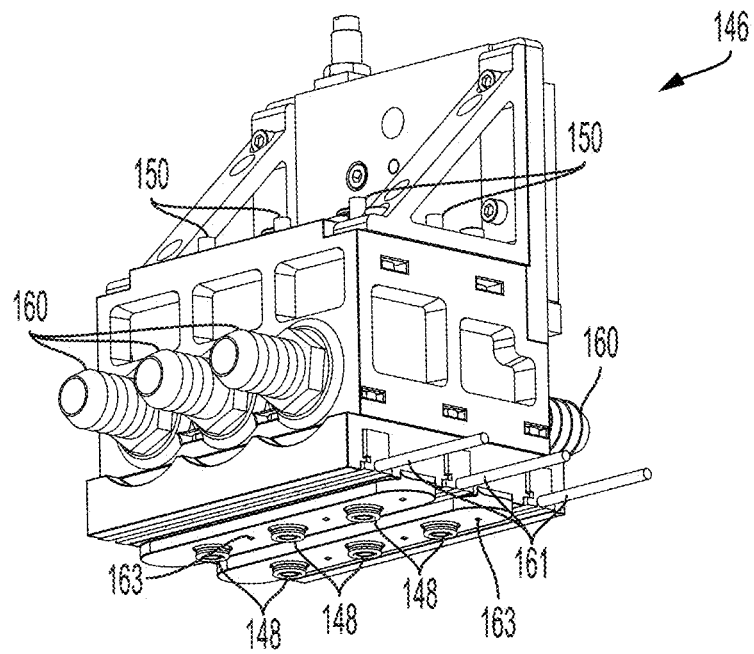
FIG. 18 is a perspective view of a nozzle block of the sample collection assembly of FIG. 17.
Figure 19:
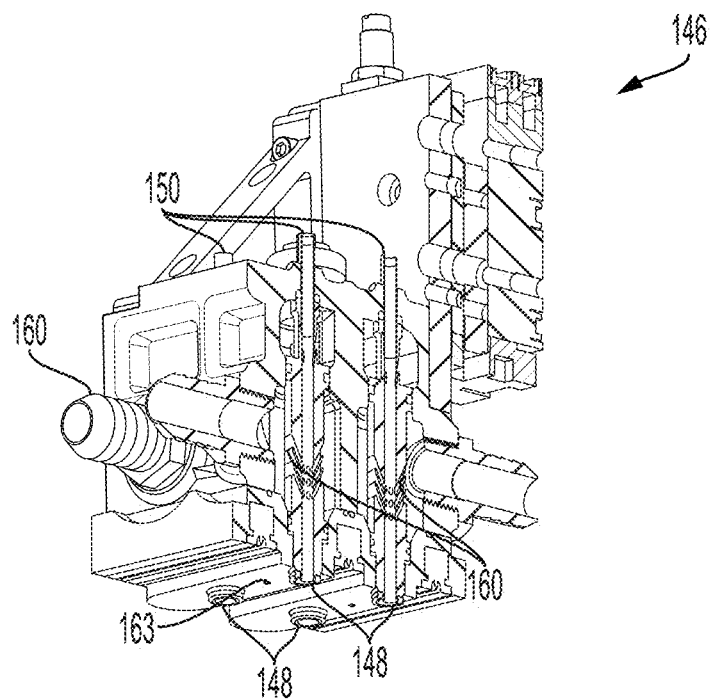
FIG. 19 is a fragmentary section view of the nozzle block of FIG. 18.

In particular, and as shown in FIGS. 17-19, the sample collection assembly 138 includes a sample plate platform 144 adapted to securely retain the sample plates 142 in fixed positions and orientations, and two nozzle blocks 146 located generally above the sample plate platform 144 and configured to transfer tissue removed from the seeds at the sampling modules 98 to the sample plates 142. Each of the sample plates 142 includes a plurality of wells, with each of the wells adapted for receiving a tissue sample extracted from a seed by one of the sampling modules 98 (via a corresponding one of the nozzle blocks 146). The nozzle blocks 146 include a plurality of discharge nozzles 148, each of which is in fluid communication with one of the sampling locations 108, 110 of the sampling modules 98 (via tubing 150 extending from the sample collection funnels 132 to corresponding ones of the discharge nozzles 148). As such, each of the sampling locations 108, 110 of the sampling modules 98 comprises a dedicated path to a well of one of the sample plates 142 at the sample collection assembly 138.

In the illustrated embodiment, the nozzle blocks 146 each include six discharge nozzles 148 for a total of twelve discharge nozzles 148 between the two nozzle blocks 146, which equal the total number of sampling locations 108, 110 at the sampling modules 98 in the seed sampling assembly 18. In addition, the discharge nozzles 148 are spaced apart and arranged to be generally congruent with the spacing and arrangement of wells within the sample plates 142.

In addition, the sample plate platform 144 of the sample collection assembly 138 is mounted to an X-Y stage 152 comprising an X-axis translating track 154 and a Y-axis translating track 156. Actuators then operate to bidirectionally move the sample plate platform 144 along the length of the X-axis and Y-axis translating tracks 154, 156, to desired positions relative to the nozzle blocks 146 (e.g., via one or more drives similar to drive 94, etc.). What's more, each of the nozzle blocks 146 is mounted to a linear actuator 158 (e.g., a pneumatic slide, etc.) operable to bidirectionally move the corresponding one of the nozzle blocks 146 in the Z-direction of the system 10 (e.g., up and down relative to the sample plate platform 144, etc.). As such, the sample plate platform 144 is capable of moving the wells of the sample plates 142 in the X-Y directions of the system 10 to particular positions under the nozzle blocks 146 (e.g., to target locations under the nozzle blocks 146, etc.). And, the nozzle blocks 146 are then capable of moving in the Z-direction of the system 10 to deposit the tissue samples removed from the seeds at the sampling modules 98 within particular ones of the wells of the sample plates 142 (with the sample plates 142 then receiving the tissue samples therein).

In connection therewith, in operation of the sample collection assembly 138, prior to the sampling modules 98 removing tissue from seeds therein (as described above), the sample collection assembly 138 operates to move wells of the sample plates 142 in the X-Y directions of the system 10 (via the sample plate platform 144 and the X-Y stage 152) to particular positions under the nozzle blocks 146 (e.g., to target locations under the nozzle blocks 146, etc.). The nozzle blocks 146 are then configured to move in the Z-direction of the system 10 to lower and position the discharge nozzles 148 in alignment with corresponding ones of the wells of the sample plates 142. In the illustrated embodiment, the discharge nozzles 148 are each configured to contact a corresponding one of the wells and form a seal therewith (e.g., via an O-ring, a gasket, a bushing, etc.). This helps ensure that substantially all of the tissue being discharged from the discharge nozzles 148 is deposited into the corresponding wells, without cross-contamination by adjacent samples escaping around the discharge nozzles 148. Further, as indicated above, the discharge nozzles 148 are spaced apart and arranged to be generally congruent with the spacing and arrangement of wells within the sample plates 142. As such, when the nozzle blocks 146 lower, the six discharge nozzles 148 of each of the nozzle blocks 146 are all configured to contact a well of one of the sample plates 142 and form a seal therewith (such that tissue samples removed from different seeds at different sampling modules 98 could potentially be deposited into different wells of a sample plate 142 by one of the nozzle blocks 146 at a given time).

Then, for each of the sampling modules 98, when a tissue sample is actually removed from a seed (as described above), the tissue is drawn into the corresponding sample collection funnel 132 and is transported to the corresponding nozzle block 146 through the tubing 150 (which, again, extends from the given sample collection funnel 132 at the particular sampling module 98 to the corresponding discharge nozzle 148 at the nozzle block 146). In turn, the tissue is deposited by the discharge nozzle 148 into a corresponding one of the wells of the sample plates 142 (with each of the tissue samples from the six different sampling modules 98 being directed to a different one of the wells of the sample plates 142). As part of this operation, the tissue is drawn through the tubing 150 via induced air flow, with the air then being exhausted through a tuned exhaust port 160 at the nozzle block 146 for the given discharge nozzle 148, while the tissue material remains in the flow path for receipt in the particular well. Once the tissue is received from each of the sampling modules 98 in the wells of the sample plates 142 (for a given sampling operation or sampling run), the nozzle blocks 146 are configured to raise and the sample collection assembly 138 is configured to position subsequent wells of the sample plates 142 at the target position, whereby the nozzle blocks 146 then again lower in preparation for transporting additional tissue samples to the sample plates 142 (for a subsequent sampling operation or sampling run by the seed sampling assembly 18). In other embodiments, tissue samples may be taken multiple times from a single seed and each tissue sample drawn to (and/or collected in) more than one sample plate well. In so doing, the system 10 may be used, for example, to separate outer seed tissue (maternal) from inner seed tissue, such that further genotyping may be targeted to a tissue source location of the seed. In even further embodiments, tissue samples from more than one seed may be drawn to (and/or collected in) a single sample plate well.

Further in the system 10, an imaging assembly 161 (e.g., an imaging camera, a laser profiler, etc.) is associated with the sample collection assembly 138 and is disposed generally between the nozzle blocks 146 to collect image data of the sample plates 142 (see, FIG. 17). This image data may then be used to determine tissue presence within the wells of the sample plates 142 and may additionally be used to quantify tissue amount, volume or weight, and may even further be used to determine contaminating tissue presence within one or more wells prior to sampling operation (and prior to receiving tissue samples in the one or more wells). The image data (as well as other image data captured by the system 10) may also be used, by the central control system, for example, to effect adjustments to the seed sampling assembly 18, etc. to help optimize tissue removal, to provide adjustments to upstream/downstream processes (e.g., sorting operations, extraction dilution target(s), genotyping processing, breeding submission requirements, selection decisions, etc.). Additionally, downstream genotyping detection data may be used in conjunction with the image data to derive contamination levels. Moreover, sensors 163 may be associated with the nozzle blocks 146 (e.g., positioned adjacent the discharge nozzles 148, etc.), and be configured to provide tissue measurement and/or quantification with regard to tissue dispensed through the nozzle blocks 146 (e.g., through each of the discharge nozzles 148, etc.). The sensors 163 may include, for example (and without limitation), mass flow measurement sensors such as optical pass-through sensors, microwave or other Doppler-effect based sensors, etc.

With that said, it should be appreciated that in various embodiments the sampling operation effected by the system 10 requires particular timing of the different operations described above in order to inhibit contamination. In connection therewith, pressure sensors may be used to drive process timing herein (in addition to the various image data collected in the system 10) to help ensure that the different components of the system 10 are at the appropriate locations at the appropriate times.

Subsequently, the tissue samples received in the sample plates 142 can be utilized to test and analyze the various traits of the respective seed from which the tissue sample was removed (as described more hereinafter).

In the illustrated embodiment, the nozzle blocks 146 of the sample collection assembly 138 each include ionizing bars 161 mounted to an underside thereof (see, FIG. 18). The ionizing bars 161 are configured to help inhibit static buildup on the nozzle blocks 146, as well as on the sample plate platform 144 and/or the sample plates 142. Further, the tubing 150 of the sample collection assembly 138 may be fabricated from static dissipative materials so that a portion of the tissue removed from the seeds and transported to the sample plates 142 do not stick to inside portions of the tubing 150 and cause cross-contamination of the samples.

Figure 20:
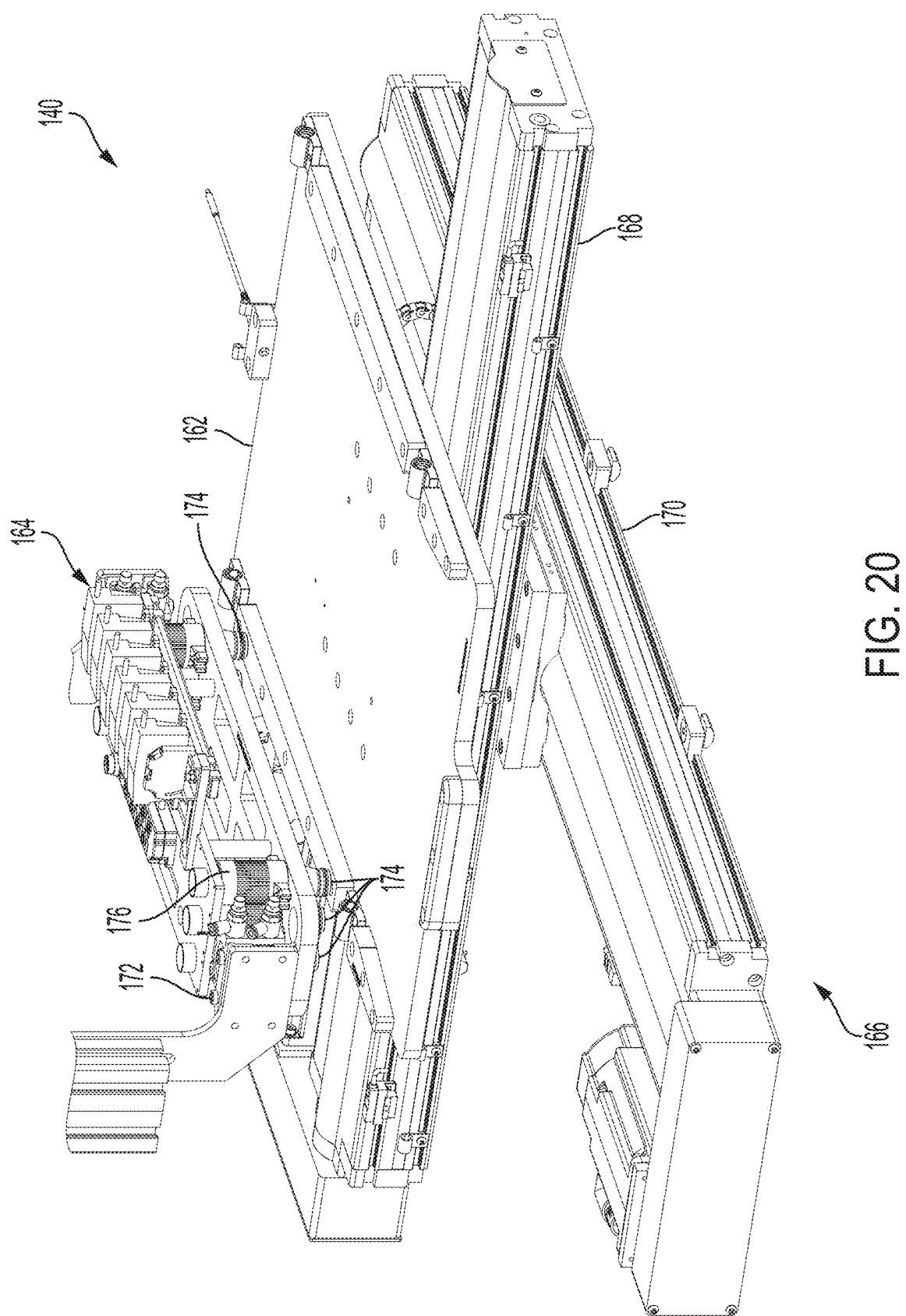
FIG. 20 is a perspective view of a seed collection assembly of the system of FIG. 1.

FIG. 20 illustrates the seed collection assembly 140 of the seed sampling system 10. As shown, the seed collection assembly 140 includes a seed tray platform 162 adapted to securely retain the seed trays (not shown) in fixed positions and orientations thereon, and a seed deposit unit 164 for directing seeds to the seed trays. Each of the seed trays includes a plurality of seed wells, each of which is adapted for receiving a seed after the respective seed has been sampled by one of the sampling modules 98. For example, in various embodiments, each seed tray can be a twenty-four well tray, etc. With that said, the seed collection assembly 140 is configured to receive the seeds from the sampling modules 98 of the seed sampling assembly 18, in the wells of the seed trays, in a manner such that the seeds can be subsequently identified to the particular tissue samples removed therefrom.

The seed tray platform 162 of the seed collection assembly 140 is mounted to an X-Y stage 166 comprising an X-axis translating track 168 and a Y-axis translating track 170. Actuators are then operable to bidirectionally move the seed tray platform 162 along the X-axis and Y-axis translating tracks 168, 170 to desired positions relative to the seed deposit unit 164 (e.g., via one or more drives similar to drive 94, etc.). What's more, the seed deposit unit 164 is mounted to a linear actuator 172 (e.g., a pneumatic slide, etc.) operable to bidirectionally move the seed deposit unit 164 in a Z-direction of the system 10 (e.g., up and down, etc.). As such, the seed tray platform 162 (via the X-Y stage 166) is able to move the wells of the seed trays in the X-Y directions of the system 10 to particular positions under the seed deposit unit 164 (e.g., to target locations under the seed deposit unit 164, etc.). And, the seed deposit unit 164 is then able to move in the Z-direction of the system 10 to move seed nozzles 174 into position to deposit the seeds released/received from the sampling modules 98 within particular wells of the seed trays (such that the seeds are received in the seed trays). Sensors 176 (only one is identified in FIG. 20) are then disposed at the seed deposit unit 164 to count the number of seeds that pass thereby (e.g., to detect either no seed passing, a single seed passing, multiple seeds passing, debris passing, etc.). In some embodiments, the seed tray platform 162 may further include an imaging assembly (e.g., comprising one or more of the imaging devices described herein, etc.) configured to determine whether or not the seeds are successfully received within the seed trays and whether or not a single seed is captured in a given well of the seed trays, and/or to capture additional seed data such as seed size, etc. Again, such data may be used, by the central control system, for example, to effect adjustments to the seed sampling assembly 18, etc. to help optimize tissue removal, to provide adjustments to upstream/downstream processes (e.g., sorting operations, extraction dilution target(s), genotyping processing breeding submission requirements, selection decisions, etc.).

Figure 21A:
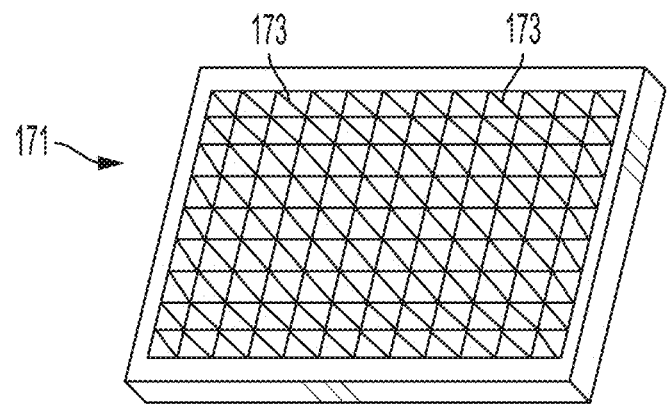
FIG. 21A is a perspective view of an exemplary embodiment of a seed tray that may be used in the system of FIG. 1.
Figure 21B:
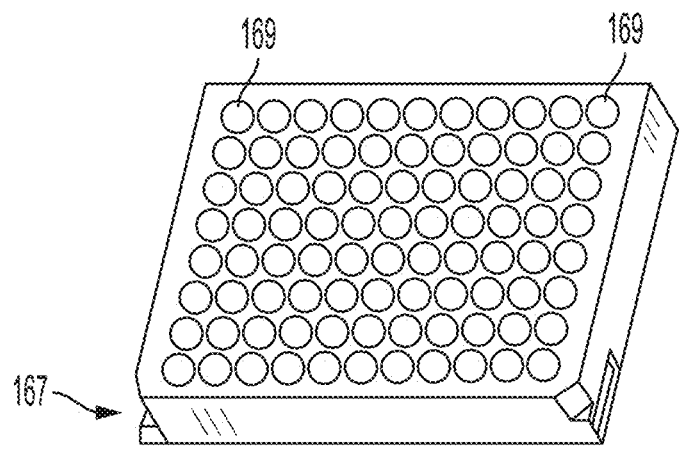
FIG. 21B is a perspective view of an exemplary embodiment of a sample plate that may be used in the system of FIG. 1.

FIG. 21A illustrates an example seed tray 171 that may be used with the seed collection assembly 140, whereby multiple ones of the seed tray 171 may then be positioned on the seed tray platform 162. In connection therewith, the illustrated seed tray 171 includes a plurality of compartments, or wells 173, for receiving seeds from the nozzle blocks 146. And, FIG. 21B illustrates an exemplary embodiment of a sample plate 167 (e.g., as an alternative to or as a part of the sample plate 142, etc.) that may be used with the sample collection assembly 138 (e.g., positioned on the sample plate platform 144, etc.). In connection therewith, the illustrated sample plate 167 includes a plurality of compartments, or wells 169. It should be appreciated that the sample plate 167 may have similar configurations to that of the seed tray 171, and/or that the number and arrangement of the wells 173 in the seed tray 171 may correspond to a number and arrangement of the wells 169 in the sample plate 167 (although this is not required in all embodiments). Such correspondence can facilitate a one-to-one correspondence between a seed and its sample. However, in some embodiments it may be desirable to provide multiple compartments in the sample plate 167 (or sample plate 142) for each compartment in the seed tray 171, for example where multiple tests may be run on the samples, or where different samples may be taken from the same seed (e.g., samples from different depths, etc.).

Further in the system 10, an imaging assembly 165 (e.g., an imaging camera, a laser profiler, etc.) (see, FIG. 3) is associated with the seed collection assembly 140 and is disposed generally above the seed tray platform 162 to collect image data of seed trays positioned thereon (and seeds received in wells therein). This image data may then be used, for example, to determine seed presence within wells of the seed trays and may additionally be used to quantify the received seeds, their volume or weight, etc., and may even further be used to determine missed seed collection or seeds received in wrong wells. The image data (as well as other image data captured by the system 10) may also be used, by the central control system, for example, to effect adjustments to the seed sampling assembly 18, etc. to help optimize tissue removal, to provide adjustments to upstream/downstream processes (e.g., sorting operations, extraction dilution target(s), genotyping processing, breeding submission requirements, selection decisions, etc.).

In operation of the seed collection assembly 140, just prior to, simultaneously with, or just after the sampling modules 98 remove tissue from seeds therein (as described above), the seed collection assembly 140 operates to position wells of the seed plates at particular positions under the seed deposit unit 164 (and relative to the seed nozzles 174). The seed deposit unit 164 is then configured to move in the Z-direction of the system 10 to lower and position the seed nozzles 174 in alignment with corresponding ones of the wells of the seed plates. Then, for each of the sampling modules 98, after a tissue sample is removed from a seed, the seed grip assembly 112 is commanded to release the seed into the corresponding seed collection funnel 134. The seed is then directed to a corresponding seed nozzle 174 at the seed deposit unit 164 via suitable tubing (not shown) extending from the seed collection funnel 134 to the particular seed nozzle 174 (e.g., via gravity, via induced air flow, etc.), where the seed is then deposited into a particular well of one of the seed trays. Once the seeds are received from each of the sampling modules 98 in the wells of the seed trays, the seed deposit unit 164 is configured to raise, and the seed collection assembly 140 is configured to position subsequent wells of the seed trays at the target position under the seed deposit unit 164, whereby the seed deposit unit 164 then again lowers in preparation for transporting additional seeds to the seed trays.

With reference again to FIG. 17, the sample collection assembly 138 of the seed sampling system 10 also includes two purge blocks 178 configured to be used in connection with operation of the seed sampling assembly 18 to clean the flow paths of tissue samples from the sampling modules 98 (for example, from the sampling locations 108, 110 of the sampling modules 98 through the tubing 150) to the nozzle blocks 146. Each of the purge blocks 178 is associated with one of the nozzle blocks 146 of the sample collection assembly 138. As such, for each of the sampling modules 98, once the tissue removed from each seed is received in one or more of the sample plates 142 and the corresponding seeds are received in the seed trays, the nozzle blocks 146 operate to lower (as described above) and seal against the purge blocks 178. In turn, blow off jets 180 (as shown in FIG. 16) of the sampling modules 98 are activated (in combination with negative pressure air flow at the sample collection funnel 132) to force any remnant seed tissue from the sampling modules 98 to the associated vacuum collection portions (or ports) of the sampling modules 98 (i.e., to the collection funnel 132), which then direct the remnant seed tissue to the nozzle blocks 146 (via the tubing 150) and to the purge blocks 178 for filtering and disposal. In addition, the seed path tubing 150 extending from the sample collection funnels 132 to corresponding ones of the discharge nozzles 148 is also cleaned via the induced airflow therein, which is then filtered at the purge blocks 178 and disposed (together with the remnant seed tissue). With that said, it should be appreciated that all surfaces in the system 10 exposed to tissue are actively cleaned during a targeted cleanout process. All tissue is removed via dedicated flow paths and filtered.

It should again be appreciated that in various embodiments the cleaning operation effected by the system 10 also requires particular timing of the different features described above in order to inhibit contamination and ensure proper cleaning. In connection therewith, and as described above (and in connection with the above) pressure sensors may be used to drive process timing herein to help ensure that the different components of the system 10 are at the appropriate locations at the appropriate times.

As described above, each of the sampling modules 98 is able to accommodate parallel sampling and cleaning operations. As such, while a first sampling location 108 of each of the sampling modules 98 is being cleaned (in the manner described above), the second sampling location of each of the sampling modules 98 may be used to perform a sampling operation on a seed (and vice versa). Material selection for each of the sampling modules 98 (and their components) includes materials configured to mitigate contamination buildup and to enable sufficient remnant tissue removal to prevent contamination of downstream genotyping detection. Again, this feature of the seed sampling system may potentially aid in throughput of the system 10.

In various embodiments, when the sample plates 142 are positioned on the sample plate platform 144 of the sample collection assembly 138, a tray identification number (e.g., a barcode, etc.) for each of the plates 142 is recorded along with the location of the plate 142 on the platform 144 (as part of a given identifier for each of the tissue samples). Additionally, as each tissue sample is received into a well of the sample plate 142, a specific X-Y location of the well (and thus the sample) can be recorded. The recorded sample plate 142 and well positions on the sample plate platform 144 can then be compared to the X-Y locations of each deposited tissue sample, to map the specific samples in each well of each sample plates 142. Similarly, when the seed trays are placed on the seed tray platform 162 of the seed collection assembly 140, a tray identification number (e.g., a barcode, etc.) for each seed tray and the location of each seed tray on the seed tray platform 162 is recorded (again, as part of a given identifier for each of the seeds). Additionally, as each seed is deposited in a well, an X-Y location of the well on the seed tray platform 162 can be recorded. The recorded tray and well positions on the seed tray platform 162 can then be compared to the X-Y locations of each deposited seed, to map the specific seed in each well of each seed tray. In this manner, the seeds received in the seed trays can be linked to the tissue received in the sample plates 142.

Figure 13:
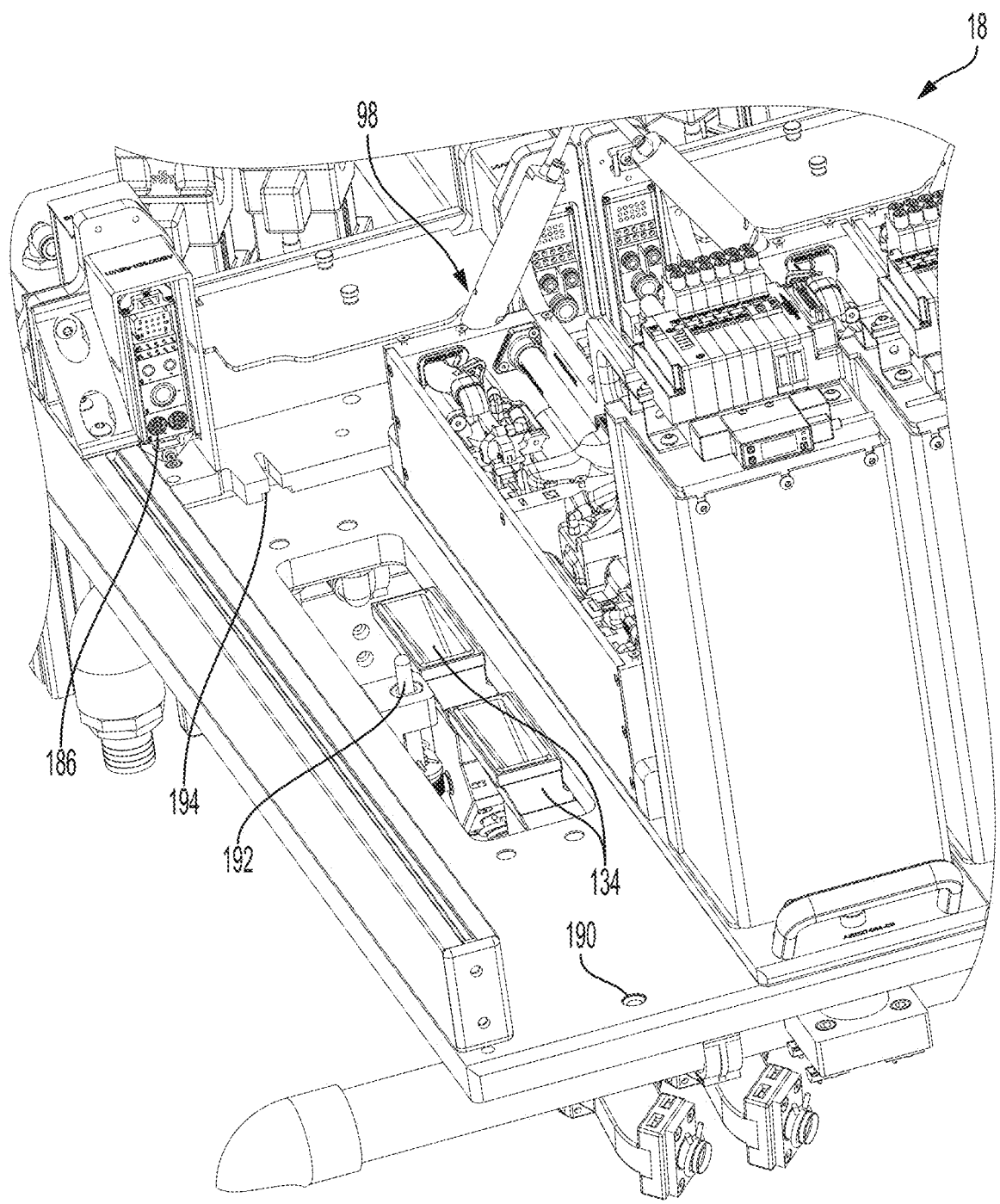
FIG. 13 is a fragmentary perspective view of the seed sampling assembly of the system of FIG. 1, with a sampling module removed therefrom.

In the illustrated embodiment, the sampling modules 98 of the seed sampling assembly 18 are generally designed to minimize tooled connections. In connection therewith, each of the sampling modules 98 can be removed from the seed sampling assembly 18 and replaced with another sampling module 98, for example, to provide hardware specific changes for specific seed projects, to minimize down time during maintenance of a given sampling module 98, etc. In addition, each of the sampling modules 98 is configured to be quickly plugged into the seed sampling system 10 for power, and unplugged therefrom. For example, as shown in FIGS. 13 and 14, each of the sampling modules 98 includes a plug 184 configured to quickly plug into or be removed from a receptacle 186 of the seed sampling assembly 18 of the system 10 (e.g., for providing power to the sampling modules 98, etc.). What's more, the sampling modules 98 can be quickly coupled to the seed sampling system 10 (and uncoupled therefrom) via couplings 190-194 of the seed sampling assembly 18 (which correspond to mating couplings (not shown) of the sampling module 98).

Also in the illustrated embodiment, the seed loading assembly 12 is illustrated as including six conduits 68 in association with the diverter manifold 66 and six elevator units 70; the seed transport assembly 14 is illustrated as including six retention members 84; the seed sampling assembly is illustrated as including six sampling modules 98; and the sample collection assembly is illustrated as including six pairs of discharge nozzles 148. However, it should be appreciated that different numbers of these parts of the seed sampling system 10 may be provided in other embodiments to adjust the throughput rate as desired. Additionally, positioning of one or more of the parts of the seed sampling system 10 may be modified to adjust the throughput rate of the system 10. With that said, in various embodiments, the system 10 may be configured to provide a sample throughput of about seven seconds per six seed cycle (from entry of the seeds into the system 10 to collection of the samples removed from the seeds and the sampled seeds).

Further in the illustrated embodiment, and as generally described above, single seed identity is generally logged and tracked in the seed sampling system 10 from the seed loading assembly 12 to the sample collection assembly 138 and the seed collection assembly 140. This is accomplished, at least in part, by maintaining individual seed paths for each of the singulated seeds from the elevator units 70 of the seed loading assembly 12, to the seed imaging assembly 16, to the seed sampling assembly 18, and to the sample and seed collection assemblies 138, 140 (via the seed transport assembly 14). In connection therewith, to facilitate such individual seed paths, corresponding ones of the elevator units 70 of the seed loading assembly 12, imaging devices 96 of the seed imaging assembly 16, and sampling modules 98 of the seed sampling assembly 18 are generally aligned in the X-direction of the seed sampling system 10. In particular, a lateral spacing (in the Y-direction of the seed sampling assembly 10) between the elevator units 70 of the seed loading assembly, between the sampling modules 98 of the seed sampling assembly 18, and between the retention members 84 of the seed transport assembly 14 are the same (or are about the same).

What's more, in the illustrated embodiment, the different grouping of seeds associated with the different seed packets are able to migrate through the seed loading assembly 12, one grouping at a time (via the individual seed paths), thereby maintaining sample integrity through the sampling process (e.g., via use of the moveable gates, barriers, etc.).

As described above, seed sampling systems (e.g., system 10, etc.) and methods/operations of the present disclosure are operable to protect, preserve, etc. germination viability of sampled seeds and thus may, for example, be considered non-destructive. For example, the size, position and/or shape of the tissue samples removed may be controlled precisely to protect germination viability of the sampled seeds. Germination viability means that a predominant number of sampled seeds, (i.e., greater than about 50% of all sampled seeds) remain viable after sampling. In a particular embodiment, at least about 75% of sampled seeds, and in some embodiments at least about 95% of sampled seeds remain viable. It should be noted that lower rates of germination viability may be tolerable under certain circumstances or for certain applications, for example, as genotyping costs decrease with time because a greater number of seeds could be sampled for the same genotype cost. It should also be noted that sampling does not need to have any effect on viability at all.

In one embodiment, germination viability of the sampled seeds is maintained for at least about six months after sampling to ensure that the sampled seeds will be viable until they reach the field for planting. In a particular embodiment, the sampled seeds are further treated to maintain germination viability. Such treatment may generally include any means known in the art for protecting a seed from environmental conditions while in storage or transport. For example, in one embodiment, the sampled seeds may be treated with a polymer and/or a fungicide to protect the sampled seed while in storage or in transport to the field before planting.

Seed sampling systems (e.g., system 10, etc.) of the present disclosure may define generally compact footprints. Such a foot print is permitted by the configurations of the seed loading assembly, the seed transport assembly, the seed imaging assembly, and/or the seed sampling assembly of the system. The compact footprint (and compact size) permits the system to be transported for operation at different locations.

Seed sampling systems (e.g., system 10, etc.) of the present disclosure are configured to accommodate different types of seeds and/or different sizes of seeds. For example, apertures of separating wheels may be configured to accommodate individual ones of different types and/or sizes of seeds (e.g., via brushes to automatically adjust for variability in seed sizes, etc.) so that the sampling systems can be used to process different types of seeds without changing the separating wheels. In addition, end portions of retention members may be configured to retain individual ones of different types and/or sizes of seeds. And, samplers (and associated sampling modules) may be configured to sample individual ones of different types and/or sizes of seeds.

Example seeds that may be used with the seed sampling systems (e.g., system 10, etc.) and methods of the present disclosure include alfalfa seed, apple seed, banana seed, barley seed, bean seed, broccoli seed, cabbage seed, canola seed, carrot seed, castorbean seed, cauliflower seed, Chinese cabbage seed, citrus seed, clover seed, coconut seed, coffee seed, maize (or corn) seed, cotton seed, cucumber seed, Douglas fir seed, dry bean seed, eggplant seed, Eucalyptus seed, fennel seed, garden bean seed, gourd seed, leek seed, lettuce seed, Loblolly pine seed, linseed seed, melon seed, oat seed, okra seed, olive seed, onion seed, palm seed, pea seed, peanut seed, pepper seed, poplar seed, pumpkin seed, Radiata pine seed, radish seed, rapeseed seed, rice seed, rye seed, spinach seed, sorghum seed, squash seed, Southern pine seed, soybean seed, strawberry seed, sugarbeet seed, sugarcane seed, sunflower seed, sweet corn seed, sweetgum seed, tea seed, tobacco seed, tomato seed, turf seed, watermelon seed, wheat seed, and *Arabidopsis thaliana* seed. And, crops analyzed using the sampled seeds and/or tissue samples obtained as disclosed herein may include forage crops, oilseed crops, grain crops, fruit crops, ornamental plants, vegetable crops, fiber crops, spice crops, nut crops, turf crops, sugar crops, beverage crops, tuber crops, root crops, forest crops, etc.

Seeds and/or tissue samples obtained from the seeds using the seed sampling systems (e.g., system 10, etc.) and related methods of the present disclosure can be analyzed as desired. For example, the sampled seeds and/or their tissue samples can be analyzed for desired traits of interest (e.g., physical, chemical, morphological, and/or genetic characteristics; markers; genotypes; etc.), etc. Generally, such traits are determined by analyzing the samples for one or more characteristics indicative of at least one genetic or chemical trait. And, analyses may include ones for starch content, protein content, oil content, determination of fatty acid profiles, etc.

Seeds and/or tissue samples obtained from the seeds using the seed sampling systems (e.g., system 10, etc.) and related methods of the present disclosure can also be used to facilitate germplasm improvement activities. For example, the seeds and/or their tissue samples may be analyzed to identify and select seeds comprising one or more desired traits (including native or non-native traits), markers, haplotypes, and genotypes. In one aspect, analytical methods may be included with the seed sampling systems (e.g., system 10, etc.) and related methods of the present disclosure to allow individual seeds that are present in a batch or a bulk population of seeds to be analyzed such that the chemical and/or genetic characteristics of the individual seeds can be determined.

Non-limiting examples of traits of interest include color (e.g., white verses red, etc.), size, shape, seed type, resistance to pests (e.g., insects, mites, fungi, yeasts, molds, bacteria, nematodes, weeds, and parasitic and saprophytic plants, etc.), falling number score (e.g., Hagberg number, etc.), baking or noodle quality, etc.

More particularly, non-limiting examples of characteristics indicative of chemical traits include proteins, oils, carbohydrates, fatty acids, amino acids, biopolymers, pharmaceuticals, starch, fermentable starch, secondary compounds, metabolites, etc. Accordingly, non-limiting examples of chemical traits include amino acid content, protein content, protein composition, starch content, fermentation yield, fermentation efficiency, energy yield, oil content, determination of protein profiles determination of fatty acid profiles, determination of metabolite profiles, etc.

And, non-limiting examples of characteristics indicative of genetic traits may include, for example, genetic markers, single nucleotide polymorphisms, simple sequence repeats, restriction fragment length polymorphisms, haplotypes, tag SNPs, alleles of genetic markers, genes, DNA-derived sequences, RNA-derived sequences, promoters, 5' untranslated regions of genes, 3' untranslated regions of genes, microRNA, siRNA, quantitative trait loci (QTL), satellite markers, transgenes, mRNA, ds mRNA, transcriptional profiles, methylation patterns, ploidy numbers (or levels), etc.

In one embodiment, the seed sampling systems (e.g., system 10, etc.) and related methods of the present disclosure can be used for removing tissue samples from wheat seeds. The tissue samples can then be analyzed for any desired features (e.g., color (e.g., white verses red, etc.), protein composition, falling number score, baking or noodle quality, etc.). Based on this analysis (e.g., based on presence or absence of one or more desired feature, etc.), sampled wheat seeds can be selected for further use (e.g., further analysis, cultivation, packaging, use in breeding operations, etc.).

In one embodiment, the seed samples obtained using the seed sampling systems (e.g., system 10, etc.) and related methods include endosperm tissue which enables the determination of allele frequencies, whereby it is possible to infer parental linkage phase for a particular marker. Further, comparison of allele frequency data between two or more germplasm pools provides insight into the targets of selection, whereby alleles increasing in frequency in conjunction with a shift in distribution of one or more traits are presumed to be linked to said trait or traits of interest. Also, evaluation of relative allele frequency data between lines can contribute to the construction of genetic linkage maps.

In another embodiment, the seed samples obtained using the seed sampling systems (e.g., system 10, etc.) and related methods can be used with doubled haploid technologies to contribute to germplasm improvement activities including economization of doubled haploid programs by selecting only preferred seed for doubling. For example, the seed samples may be taken to include haploid and doubled haploid material and analyzed for both genotypic and chemical characteristics, and then used in connection with trait integration and evaluation and marker-assisted breeding.

Seeds and/or tissue samples obtained from the seeds using the seed sampling systems (e.g., system 10, etc.) and related methods of the present disclosure can also be used in a breeding program to select plants or seeds having a desired genetic or chemical trait, wherein a desired genetic trait comprises a genotype, a haplotype, an allele, a sequence, a transcript profile, and a methylation pattern. For example, the seeds and/or their tissue samples can be used in combination with any breeding methodology and can be used to select a single generation or to select multiple generations. The choice of breeding method depends on the mode of plant reproduction, the heritability of the trait(s) being improved, and the type of cultivar used commercially (e.g., F1 hybrid cultivar, pureline cultivar, etc.). Selected, non-limiting approaches for breeding the plants are set forth below. It is further understood that any commercial and non-commercial cultivars can be utilized in a breeding program. Factors including, for example, without limitation, emergence vigor, vegetative vigor, stress tolerance, disease resistance, branching, flowering, seed set, seed size, seed density, standability, and threshability will generally dictate the choice.

In a particular embodiment, the seeds and/or the tissue samples obtained from the seeds using the seed sampling systems (e.g., system 10, etc.) and related methods of the present disclosure are used to determine the genetic characteristics of seeds in a marker-assisted breeding program. This allows for improved marker-assisted breeding programs wherein direct seed sampling (such as disclosed herein) can be conducted while maintaining the identity of individual seeds from the seed sampling system (e.g., system 10, etc.) to the field. As a result, the marker-assisted breeding program results in a "high-throughput" and more efficient platform wherein a population of seeds having a desired trait, marker or genotype can be more effectively bulked in a shorter period of time, with less field and labor resources required. Such advantages will be more fully described below.

In some example embodiments, the seeds and/or the tissue samples obtained from the seeds using the seed sampling systems (e.g., system 10, etc.) and related methods of the present disclosure can be used in connection with processes for analyzing nucleic acids extracted from the seeds and/or samples for the presence or absence of at least one genetic marker. Desired seeds can then be selected, based on the results of the nucleic acid analysis, for example, for cultivating plants, etc. In connection therewith, the system 10 may be integrated with a corresponding tissue analysis unit, whereby the tissue samples removed from the seeds may be transported to the analysis unit in an automated fashion (e.g., sample plates may be transported to the analysis unit independent of human intervention, etc.).

For example, DNA may be extracted from the tissue samples using any DNA extraction methods known to those of skill in the art which will provide sufficient DNA yield, DNA quality, PCR response, and sequencing methods response. A non-limiting example of suitable DNA-extraction methods is SDS-based extraction with centrifugation. In addition, the extracted DNA may be amplified after extraction using any amplification method known to those skilled in the art. For example, one suitable amplification method is the GenomiPhi® DNA amplification prep from Amersham Biosciences.

In addition (or alternatively), RNA may be extracted from the tissue samples using any RNA extraction methods known to those of skill in the art which will provide sufficient RNA yield, RNA quality, PCR response, and sequencing methods response. A non-limiting example of suitable RNA-extraction methods is SDS-based extraction with centrifugation with consideration for RNase-free reagents and supplies. In addition, the extracted RNA may be amplified after extraction using any amplification method known to those skilled in the art. For example, one suitable amplification method is the Full Spectrum™ RNA Amplification from System Biosciences.

The extracted nucleic acids are analyzed for the presence or absence of a suitable genetic polymorphism. A wide variety of genetic markers for the analysis of genetic polymorphisms are available and known to those of skill in the art. As used herein, genetic markers include, but are not limited to, simple sequence repeats (SSRs), single nucleotide polymorphisms (SNPs), insertions or deletions (Indels), single feature polymorphisms (SFPs) or transcriptional profiles, and nucleic acid sequences. A nucleic acid analysis for the presence or absence of the genetic marker can be used for the selection of seeds in a breeding population. The analysis may be used to select for genes, QTL, alleles, or genomic regions (haplotypes) that comprise or are linked to a genetic marker. Herein, analysis methods are known in the art and include, but are not limited to, PCR-based detection methods (for example, TaqMan assays), microarray methods, and nucleic acid sequencing methods. The genes, alleles, QTL, or haplotypes to be selected for can be identified using newer techniques of molecular biology with modifications of classical breeding strategies.

In one of these example embodiments, sampled seeds are selected based on the presence or absence of one or more characteristics that are genetically linked with a QTL. Examples of QTLs which are often of interest include but are not limited to herbicide tolerance, disease resistance, insect or pest resistance, altered fatty acid, protein or carbohydrate metabolism, increased grain yield, increased oil, increased nutritional content, increased growth rates, enhanced stress tolerance, preferred maturity, enhanced organoleptic properties, altered morphological characteristics, other agronomic traits, traits for industrial uses, or traits for improved consumer appeal, or a combination of traits as a multiple trait index. Alternatively, the seeds can be selected based on the presence or absence of one or more characteristics that are genetically linked with a haplotype associated with a QTL. Examples of such QTL may again include without limitation herbicide tolerance, disease resistance, insect or pest resistance, altered fatty acid, protein or carbohydrate metabolism, increased grain yield, increased oil, increased nutritional content, increased growth rates, enhanced stress tolerance, preferred maturity, enhanced organoleptic properties, altered morphological characteristics, other agronomic traits, traits for industrial uses, or traits for improved consumer appeal, or a combination of traits as a multiple trait index.

Selection of a breeding population could be initiated as early as the F2 breeding level, if homozygous inbred parents are used in the initial breeding cross. An F1 generation could also be sampled and advanced if one or more of the parents of the cross are heterozygous for the alleles or markers of interest. The breeder may analyze an F2 population to retrieve the marker genotype of every individual in the population. Initial population sizes, limited only by the number of available seeds for analysis, can be adjusted to meet the desired probability of successfully identifying the desired number of individuals. Accordingly, the probability of finding the desired genotype, the initial population size, and the targeted resulting population size can be modified for various breeding methodologies and inbreeding level of the sampled population.

The selected seeds may be bulked or kept separate depending on the breeding methodology and target. For example, when a breeder is analyzing an F2 population for disease resistance, all individuals with the desired genotype may be bulked and planted in the breeding nursery. Conversely, if multiple QTL with varying effects for a trait such as grain yield are being selected from a given population, the breeder may keep individual identity preserved, going to the field to differentiate individuals with various combinations of the target QTL.

Several methods of preserving single seed identity can be while transferring sampled seeds from the sampling location (e.g., from the seed sampling system 10, etc.) to the field. Methods include, but are not limited to, transferring selected individuals (e.g., directly from the seed sampling system 10, etc.) to trays (e.g., seed trays, etc.), seed tapes, a cassette trays, indexing trays, or transplanting the sampled seeds with peat pots, and hand-planting from individual seed packets, or direct labeling of individual seeds (e.g., via inkjet printing, or laser engraving, etc.) with numeric, alpha, or alphanumeric characters or barcodes.

Multiple cycles of selection can be utilized depending on breeding targets and genetic complexity.

Advantages of using the seed sampling systems (e.g., system 10, etc.) and related methods of the present disclosure (including the analytic and seed breeding methods) include, without limitation, reduction of labor and field resources required per population or breeding line, increased capacity to evaluate a larger number of breeding populations per field unit, and increased capacity to analyze breeding populations for desired traits prior to planting. Field resources per population are reduced by limiting the field space required to advance the desired genotypes. For example, a population of 1,000 individuals may be planted at twenty-five seeds per row consuming a total of forty rows in the field. Using conventional tissue sampling, all 1,000 plants would be tagged and manually sampled by scoring leaf tissue. Molecular marker results would be needed prior to pollination and only those plants containing the desired genetic composition would be pollinated. Thus, if it was determined that fifty seeds contained the desired genetic composition, conventional breeding methodology would have required the planting of 1,000 plants to retain the desired fifty seeds. By contrast, the present disclosure allows the breeder to analyze the 1,000 seeds in the lab and select the fifty desired seeds prior to planting. The fifty individuals can then be planted in the field, consuming only two twenty-five seed rows. Additionally, the present disclosure allows the breed to avoid tagging or sampling in the field, thereby significantly reducing the required manual labor resources.

In addition to reducing the number of field rows per population, using the seed sampling systems (e.g., system 10, etc.) and related methods of the present disclosure (including the analytic and seed breeding methods) may further allow for increasing the number of populations the breeder can evaluate in a given breeding nursery. Using the above example wherein fifty seeds out of each population of 1,000 seeds contained the desired genetic composition, a breeder applying the technology of the present disclosure could evaluate twenty populations of fifty seeds each using the same field area consumed by a single population using conventional field tissue sampling techniques. Even if the populations are selected for a single allele, using a 1:2:1 expected segregation ratio for an F2 population, the breeder could evaluate four populations in the same field area as a single field tissue sampled population.

A potential further advantage to using the seed sampling systems (e.g., system 10, etc.) and related methods of the present disclosure (including the analytic and seed breeding methods) is the mitigation of risks associated with growing plants in certain geographies where plants may grow poorly or experience poor environmental conditions, or may even be destroyed during storms. For example, seeds with the "best" genotype or marker composition could be planted in geography 1 and seeds with the "next best" genotype could be planted in geography 2. In this case geography 2 would be a backup in case any problem befell the plants grown in geography 1. This is very difficult to do with the traditional method of taking tissue samples from germinated plants for genotyping, because these plants would then need to be uprooted and transplanted to the second geography. Using the seed sampling systems (e.g., system 10, etc.) and related methods of the present disclosure (including the analytic and seed breeding methods) avoids the problem of transplantation and also simplifies the logistics of the breeding program.

In some embodiments, the seed sampling systems (e.g., system 10, etc.) and related methods of the present disclosure (including the analytic and seed breeding methods) may further be used in a breeding program for introgressing a trait into a plant. Here, nucleic acids extracted from the tissue samples are analyzed for the presence or absence of at least one genetic marker. Seeds are then selected based on the results of the nucleic acids analysis, and plants are cultivated from the selected seeds. The cultivated plants can then be used as either female parents or male parents in crosses with other plants.

Examples of genetic analyses to select seeds for trait integration include, without limitation, identification of high recurrent parent allele frequencies, tracking of transgenes of interest or screening for the absence of unwanted transgenes, selection of hybrid testing seed, selection of seed expressing a gene of interest, selection of seed expressing a heritable phenotype, identification of seed with selected genetic loci, and zygosity testing.

The identification of high recurrent pair allele frequencies using the seed sampling systems (e.g., system 10, etc.) and related methods of the present disclosure (including the analytic and seed breeding methods) again allows for a reduced number of rows per population and an increased number of populations, or inbred lines, to be planted in a given field unit. Thus, the present disclosure may also effectively reduce the resources required to complete the conversion of inbred lines.

The seed sampling systems (e.g., system 10, etc.) and related methods of the present disclosure and tissue samples obtained therefrom (and the described analytic and seed breeding methods) further provide quality assurance (QA) and quality control (QC) by assuring that regulated or unwanted transgenes, undesirable genetic traits, or undesirable inherited phenotypes are identified and discarded prior to planting. This application in a QA capacity could effectively eliminate unintentional release infractions. A further extension of the present disclosure is to screen for the presence of infectious agents and remove contaminated seed prior to shipping.

The seed sampling systems (e.g., system 10, etc.) and related methods of the present disclosure (and the described analytic and seed breeding methods) may be further applied to identify hybrid seed for transgene testing. For example, in a conversion of an inbred line at the BCnF1 stage, a breeder could effectively create a hybrid seed lot (barring gamete selection) that was 50% hemizygous for the trait of interest and 50% homozygous for the lack of the trait in order to generate hybrid seed for testing. The breeder could then analyze all F1 seeds produced in the test cross and identify and select those seeds that were hemizygous. Such method is advantageous in that inferences from the hybrid trials would represent commercial hybrid genetics with regard to trait zygosity.

In one example, systems and methods of the present disclosure may be used for evaluating transgenic seeds for segregation distortion. Seeds of an F1 cross between Line A (Homozygous Event 1 and Event 2) and Line B (Homozygous Event 1) were induced in a maternal haploid induction isolation. The resulting kernels were selected using plumule color to obtain a population of putative haploid seed.

Individual putative haploid kernels from the population of putative haploid seed may be selected and non-destructively sampled using an automated seed sampler system (e.g., the seed sampling system 10 as generally described herein, etc.). Markers were applied to the samples to determine the presence of the Event 2 gene and the Event 1 gene. The sampling process may remove some pericarp and endosperm tissue and use this as the base for analysis. It is important to note that endosperm tissue is triploid and contains genetic contribution from both parents. If the gene of interest is detected using this method, it accurately predicts the presence of the desired gene in the haploid embryo. For the purposes of this study, samples from 180 kernels were analyzed and data were obtained on 175 due to sampling issues. In connection therewith (and as mentioned above), the system 10 may enable embryo targeted sampling/tissue removal to generate true doubled haploid genetic information, without inducer genome presence (triploid nature).

As shown in Table 1, each of the seed samples tested positive for the Event 1 gene as expected and approximately 50% of the seed samples tested positive for the Event 2 gene, confirming no segregation distortion.

TABLE 1

| Pedigree | Event 2 | Event 1 |
| --- | --- | --- |
| Chromosome | 6 | 8 |
| Position | 38 | 63 |
| Parental Checks | | |
| Line A | Pos | Pos |
| Line B | Neg | Pos |
| KHI1 | Neg | Neg |
| Selected Kernels | 175 | 175 |
| Total Positive | 92/175 | 175/175 |
| Total Negative | 83/175 | 0/175 |

Results of this study indicate that individual gene traits can be selected on a haploid basis using high throughput, nondestructive seed sampling as a screening mechanism.

Other applications of the seed sampling systems (e.g., system 10, etc.) and related methods of the present disclosure (including the described analytic and seed breeding methods) include use in identifying, tracking, and stacking traits of interest, which carry the same advantages identified above with respect to required field and labor resources. Generally, transgenic conversion programs are executed in multi-season locations which carry a much higher land and management cost structure. As such, the impact of either reducing the row needs per population or increasing the number of populations within a given field unit are significantly more dramatic on a cost basis versus temperate applications.

The seed sampling systems (e.g., system 10, etc.) and related methods of the present disclosure (including the described analytic and seed breeding methods) may also be used for seeds from plants with two or more transgenes, wherein accumulating or stacking of transgenic regions into plants or lines is achieved by addition of transgenes by transformation, or by crossing parent plants or lines containing different transgenic regions, or any combination of these. Analyses can be conducted to select individual seeds on the basis of the presence of one or more characteristics associated with at least one transgene. Such characteristics include, but are not limited to, a transgene per se, a genetic marker linked to a transgene, mRNA expressed from a transgene, and a protein product of a transgene.

Still further, the seed sampling systems (e.g., system 10, etc.) and related methods of the present disclosure (including the described analytic and seed breeding methods) may be used to improve the efficiency of the doubled haploid program through selection of desired genotypes at the haploid stage and identification of ploidy level to eliminate non-haploid seeds from being processed and advancing to the field. Both applications again result in the reduction of field resources per population and the capability to evaluate a larger number of populations within a given field unit.

Doubled haploid (DH) plants provide an invaluable tool to plant breeders, particularly for generating inbred lines. A great deal of time is spared as homozygous lines are essentially instantly generated, negating the need for multigenerational conventional inbreeding.

In particular, because DH plants are entirely homozygous, they are very amenable to quantitative genetics studies. Both additive variance and additive x additive genetic variances can be estimated from DH populations. Other applications include identification of epistasis and linkage effects. For breeders, DH populations have been particularly useful in QTL mapping, cytoplasmic conversions, and trait introgression. Moreover, there is value in testing and evaluating homozygous lines for plant breeding programs. All of the genetic variance is among progeny in a breeding cross, which improves selection gain.

However, it is well known in the art that DH production process is inefficient and can be quite labor-intensive. While doubled haploid plants can occur spontaneously in nature, this is extremely rare. Most research and breeding applications rely on artificial methods of DH production. The initial step involves the haploidization of the plant which results in the production of a population comprising haploid seed. Non-homozygous lines are crossed with an inducer parent, resulting in the production of haploid seed. Seed that has a haploid embryo, but normal triploid endosperm, advances to the second stage. That is, haploid seed and plants are any plant with a haploid embryo, independent of the ploidy level of the endosperm.

After selecting haploid seeds from the population, the selected seeds undergo chromosome doubling to produce doubled haploid seeds. A spontaneous chromosome doubling in a cell lineage will lead to normal gamete production or the production of unreduced gametes from haploid cell lineages. Application of a chemical compound, such as colchicine, can be used to increase the rate of diploidization. Colchicine binds to tubulin and prevents its polymerization into microtubules, thus arresting mitosis at metaphase, can be used to increase the rate of diploidization, i.e. doubling of the chromosome number These chimeric plants are self-pollinated to produce diploid (doubled haploid) seed. This DH seed is cultivated and subsequently evaluated and used in hybrid testcross production.

However, processes for producing DH seed generally suffer from low efficacy even though methods have been developed in an attempt to increase DH production frequency, including treatment with colchicines. Outstanding issues include low production of haploid seed, reduced gamete viability resulting in diminished self-pollination for DH plant generation, and inadequate DH seed yield for breeding applications.

The seed sampling systems (e.g., system 10, etc.) and related methods of the present disclosure (including the described analytic and seed breeding methods) represent an advance in breeding applications by facilitating the potential for selection at the haploid as well as the diploid seed stage. For example, the seed sampling systems (e.g., system 10, etc.) and related methods of the present disclosure (including the described analytic and seed breeding methods) can provide for the high-throughput sampling of an entire population of haploid seed, and allow for the subsequent analysis of the samples removed from the seeds. This can also provide for the high-throughput bulking of an entire population of doubled haploid seeds. The samples may be analyzed for the presence or absence of one or more characteristics indicative of at least one genetic or chemical trait and, based on the results of the analysis, one or more individual doubled haploid seeds can then be selected and plants or plant tissue can cultivated from the selected doubled haploid seeds.

The seed sampling systems (e.g., system 10, etc.) and related methods of the present disclosure (including the described analytic and seed breeding methods) can also include operations associated therewith for analyzing seeds for one or more characteristics, such as, for example, genetic markers, transgenes, markers linked to or diagnostic of transgenes, characteristics related to event performance, event evaluation, and trait integration, etc. to determine whether the seeds are in a haploid or diploid state and/or to select preferred genotypic and phenotypic classes to undergo doubling.

In another embodiment, the seed sampling systems (e.g., system 10, etc.) and related methods of the present disclosure (including the described analytic and seed breeding methods) can be used with operations for determining linkage phase. By using seed endosperm tissue derived from a diploid plant, the parental marker haplotypes can be determined using a genotyping system that enables detection of different allele frequencies in DNA samples. Since endosperm tissue is triploid, with two copies derived from the female gamete, the linkage phase of the parental line can be derived by dissecting heterozygous progeny genotypes. The DNA sample from endosperm tissue allows for a determination of the ploidy level of the genetic marker. A diploid ploidy level in the genetic marker indicates maternal inheritance and a haploid ploidy level in the genetic marker indicates paternal inheritance.

Further, differential allele frequency data can be used to infer the genetic linkage map but, unlike methods requiring haploid material, using the above-described allele frequency calling. Determination of the genetic linkage map has tremendous utility in the context of haplotype characterization, mapping of marker (or haplotype)—trait associations. This is particularly robust on a single, vs. bulked, seed basis and is thus well-suited for use in association with the seed sampling systems (e.g., system 10, etc.) and related methods of the present disclosure (including the described analytic and seed breeding methods).

In another embodiment, the seed sampling systems (e.g., system 10, etc.) and related methods of the present disclosure (including the described analytic and seed breeding methods) may further be used in connection with an assay for predicting embryo zygosity for a particular gene of interest (GOI). The assay predicts embryo zygosity based on the ratio of the relative copy numbers of a GOI and of an internal control (IC) gene per cell or per genome. Generally, this assay uses an IC gene that is of known zygosity, e.g., homozygous at the locus (two IC copies per diploid cell), for normalizing measurement of the GOI. The ratio of the relative copy numbers of the IC to the GOI predicts the GOI copy number in the cell. In a homozygous cell, for any given gene (or unique genetic sequence), the gene copy number is equal to the cell's ploidy level since the sequence is present at the same locus in all homologous chromosomes. When a cell is heterozygous for a particular gene (or hemizygous in the case of a transgene), the gene copy number will be lower than the cell's ploidy level. If the GOI is not detected, the cell is null for the locus, as can happen for a negative segregant of a transgenic event or in a mutagenized population. The zygosity of a cell at any locus can thus be determined by the gene copy number in the cell.

In a particular embodiment, the seed sampling systems (e.g., system 10, etc.) and related methods of the present disclosure (including the described analytic and seed breeding methods) may be used in connection with an assay for predicting corn embryo zygosity. In corn seed, the endosperm tissue is triploid, whereas the embryo tissue is diploid. Endosperm copy number is reflective of the zygosity of the embryo: a homozygous (positive or negative) endosperm accompanies a homozygous embryo, heterozygous endosperm (whether a GOI copy number of 1 or 2) reflects a heterozygous (GOI copy number of 1) embryo. Endosperm that is homozygous for the IC will contain three IC copies. Endosperm GOI copy number can range from 0 (homozygous negative embryo) to 3 (homozygous positive embryo); and endosperm GOI copy number of 1 or 2 is found in seed where the embryo is heterozygous for the GOI (or hemizygous for the GOI if the GOI is a transgene). The endosperm GOI copy number (which can range from 0 to 3 copies) can be determined from the ratio of endosperm IC copy number to endosperm GOI copy number (which can range from 0/3 to 3/3, that is, from 0 to 1), which can then be used to predict zygosity of the embryo.

Copy numbers of the GOI or of the IC can be determined by any convenient assay technique for quantification of copy numbers, as is known in the art. Examples of suitable assays include, but are not limited to, Real Time (TaqMan®) PCR (Applied Biosystems, Foster City, CA) and Invader® (Third Wave Technologies, Madison, WI) assays. Preferably, such assays are developed in such a way that the amplification efficiency of both the IC and GOI sequences are equal or very similar. For example, in a Real Time TaqMan® PCR assay, the signal from a single-copy GOI (the source cell is determined to be heterozygous for the GOI) will be detected one amplification cycle later than the signal from a two-copy IC, because the amount of the GOI is half that of the IC. For the same heterozygous sample, an Invader® assay would measure a GOI/IC ratio of about 1:2 or 0.5. For a sample that is homozygous for both the GOI and the IC, the GOI signal would be detected at the same time as the IC signal (TaqMan®), and the Invader assay would measure a GOI/IC ratio of about 2:2 or 1.

These guidelines apply to any polyploid cell, or to haploid cells (such as pollen cells), since the copy number of the GOI or of the IC remain proportional to the genome copy number (or ploidy level) of the cell. Thus, these zygosity assays can be performed on triploid tissues such as corn endosperm. Furthermore, the copy number for a GOI can be measured beyond 2 copies or at numerically different values than the ploidy of the cell. The method is still appropriate for detecting GOI in polyploids, in some transgenic events with >2 copies of the inserted transgene, after replication of the GOI by transposition, when the GOI exists on autonomously replicating chromosomes or plasmids and other situations.

In plant breeding, it is useful to determine zygosity at one or more loci for the purpose of evaluating the level of inbreeding (that is, the degree of gene fixation), segregation distortion (i.e., in transgenic germplasm, maternal inheritance testing or for loci that affect the fitness of gametes), and the level of outbreeding (i.e., the relative proportion of homozygosity and heterozygosity). Similarly, the extent of zygosity at one or more loci can be used to estimate hybridity and whether a particular seed lot meets a commercial or regulatory standard for sale as certified hybrid seed. In addition, in transgenic germplasm, it is useful to know the ploidy, or copy number, in order to distinguish between quality events and to aid in trait integration strategies.

In another embodiment, the seed sampling systems (e.g., system 10, etc.) and related methods of the present disclosure (including the described analytic and seed breeding methods) may be used in connection with operations for improving the ability to monitor one or more germplasm pools for shifts in the frequencies of one or more genetic characteristics, wherein said genetic characteristics include markers, alleles, and haplotypes. Methodology is known in the art to compare genetic marker frequency between recently derived populations and their ancestral lines in order to identify those genetic loci that are increasing in frequency over time (U.S. Pat. Nos. 5,437,697 and 5,746,023). Those loci with frequencies that exceed the expected allele frequency are inferred to have been subject to selection. Further, given that the predominant selection criterion in breeding programs is yield, it is expected that those increasingly frequent alleles may be linked to yield.

In a particular embodiment, the seed sampling systems (e.g., system 10, etc.) and related methods of the present disclosure (including the described analytic and seed breeding methods) may be used in connection with operations to enable haplotype-assisted breeding. By comparing the frequency of haplotypes in emerging elite lines with the haplotype frequency in the ancestral elite lines (as determined via pedigree analysis), identification of haplotypes that are deviating from the expected haplotype frequency is possible. Further, by evaluation of haplotype effect estimates for said haplotypes, it is also possible to link said haplotypes of increasing frequency with phenotypic outcomes for a suite of agronomic traits. The haplotype composition of individual seeds sampled from a plurality of seeds can be determined using genetic markers and the seeds with preferred haplotypes are selected and advanced. Thus, more informed breeding decisions and establishment of superior line development programs is enabled by this technology.

Figure 22:
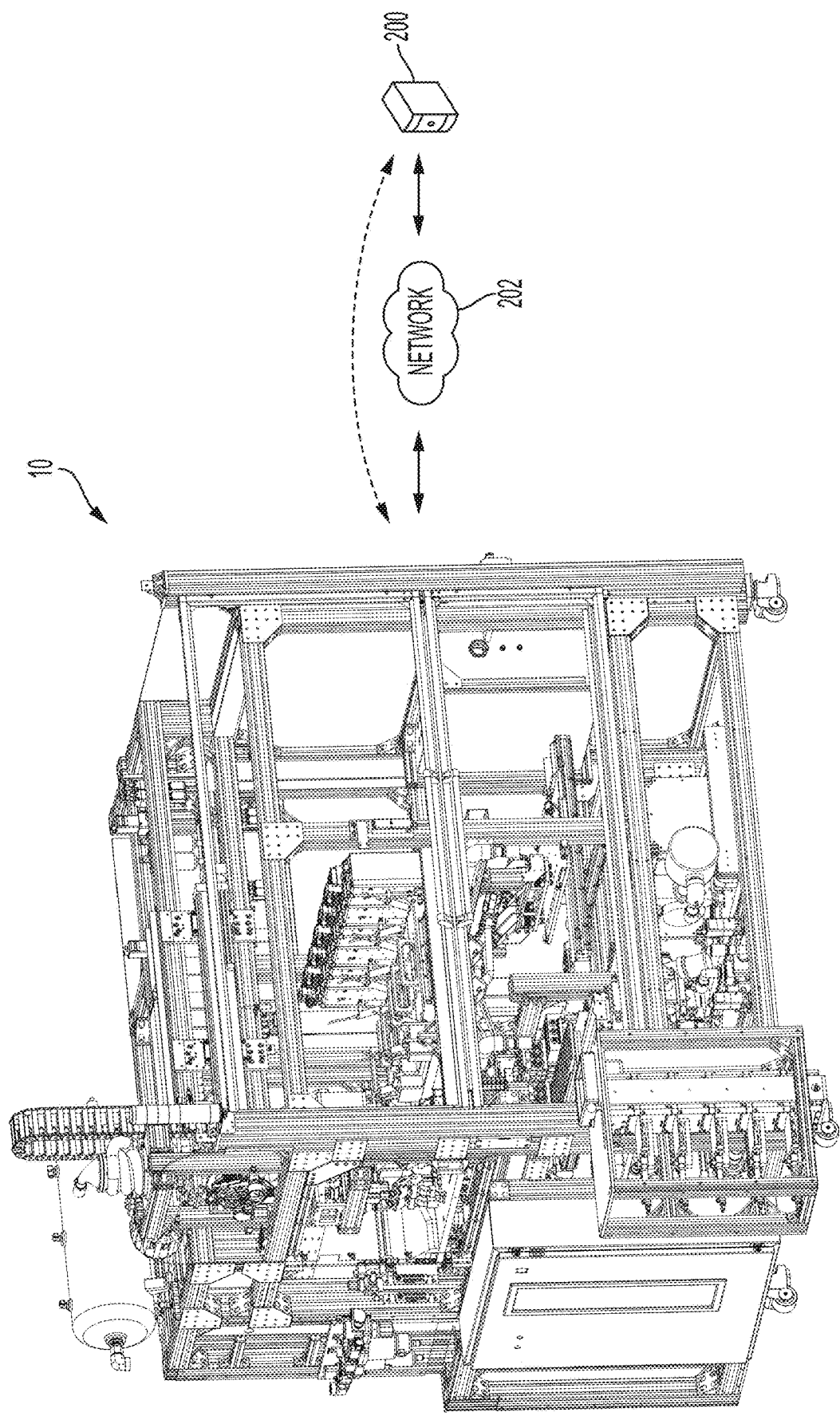
FIG. 22 is a block diagram of an exemplary relationship between the system of FIG. 1 and a control system suitable or use therewith.

As described above, the seed sampling system 10 (and the various components thereof) may be controlled (and/or coordinated) by a central control system (broadly, a computing device). In connection therewith, FIG. 22 illustrates an exemplary relationship between the seed sampling system 10 and such a corresponding control system 200. As shown, the seed sampling system 10 is coupled to (and is in communication with) the control system 200 via network 202, to facilitate the communication and interaction described above. And, in connection therewith, the network 202 may include, without limitation, a local area network (LAN), a wide area network (WAN) (e.g., the Internet, etc.), a mobile network, a virtual network, and/or another suitable public and/or private network capable of supporting communication among the seed sampling system 10 and the control system 200, or any combination thereof. Alternatively, as indicated by the dotted line in FIG. 22, the seed sampling system 10 may be directly coupled to (and in communication with) the control system 200, for example, via a wired connection, etc. (e.g., the control system 200 may be an integral part of the seed sampling system 10, etc.).

Figure 23:
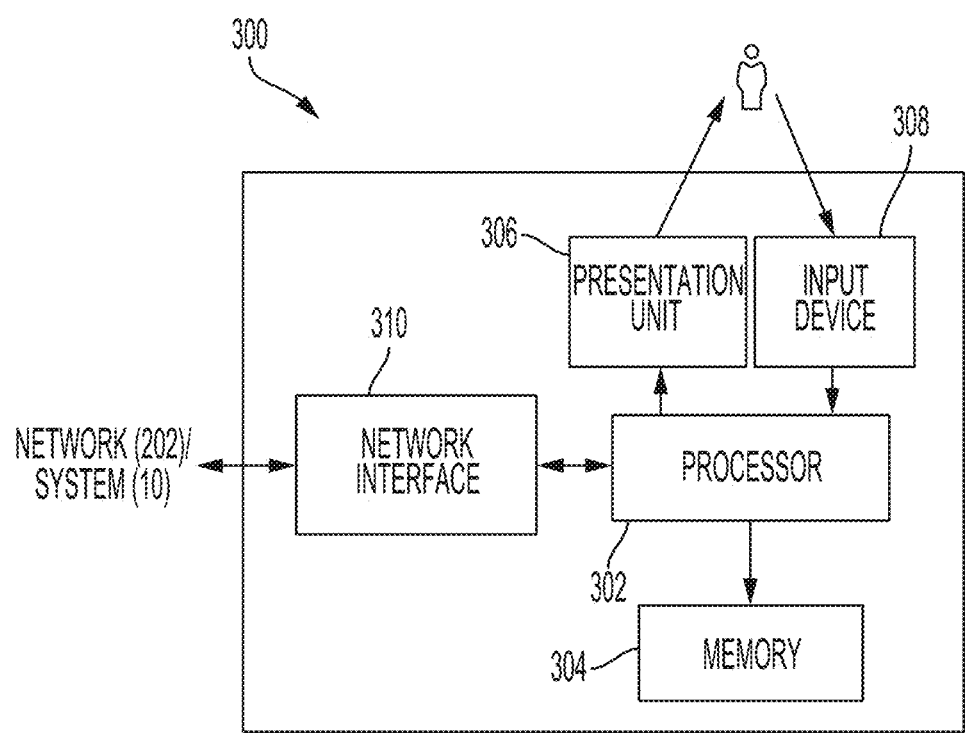
FIG. 23 is a block diagram of a computing device that may be used in the exemplary arrangement of FIG. 22.

FIG. 23 illustrates an exemplary computing device 300 that can be used in connection with the seed sampling system 10 and the control system 200. The computing device 300 may include, for example, one or more servers, workstations, personal computers, laptops, tablets, smartphones, etc. In addition, the computing device 300 may include a single computing device, or it may include multiple computing devices located in close proximity or distributed over a geographic region, so long as the computing devices are specifically configured to function as described herein. In the exemplary embodiment of FIG. 22, each of the seed sampler system 10 and the control system 200 may be considered as including and/or being implemented in at least one computing device consistent with computing device 300. However, the present disclosure should not be considered to be limited to the computing device 300, as described below, as different computing devices and/or arrangements of computing devices and/or arrangement of components associated with such computing devices may be used.

Referring to FIG. 23, the exemplary computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. The memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 304 may be configured to store, without limitation, the various data (and/or corresponding data structures) described herein. Furthermore, in various embodiments, computer-executable instructions may be stored in the memory 304 for execution by the processor 302 to cause the processor 302 to perform one or more of the functions described herein, such that the memory 304 is a physical, tangible, and non-transitory computer readable storage media. Such instructions often improve the efficiencies and/or performance of the processor 302 and/or other computer system components configured to perform one or more of the various operations herein. It should be appreciated that the memory 304 may include a variety of different memories, each implemented in one or more of the functions or processes described herein.

In the exemplary embodiment, the computing device 300 also includes a presentation unit 306 that is coupled to (and is in communication with) the processor 302 (however, it should be appreciated that the computing device 300 could include output devices other than the presentation unit 306, etc.). The presentation unit 306 outputs information to users of the computing device 300 as desired. And, various interfaces (e.g., as defined by network-based applications, etc.) may be displayed at computing device 300, and in particular at presentation unit 306, to display such information. The presentation unit 306 may include, without limitation, a liquid crystal display (LCD), a light-emitting diode (LED) display, an organic LED (OLED) display, an "electronic ink" display, speakers, etc. In some embodiments, the presentation unit 306 may include multiple devices.

In addition, the computing device 300 includes an input device 308 that receives inputs from the users of the computing device 300. The input device 308 may include a single input device or multiple input devices. The input device 308 is coupled to (and is in communication with) the processor 302 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both a presentation unit and an input device.

Further, the illustrated computing device 300 also includes a network interface 310 coupled to (and in communication with) the processor 302 and the memory 304. The network interface 310 may include, without limitation, a wired network adapter, a wireless network adapter, a mobile network adapter, or other device capable of communicating to one or more different networks, including the network 202, and/or the seed sampler system 10. Further, in some exemplary embodiments, the computing device 300 may include the processor 302 and one or more network interfaces incorporated into or with the processor 302.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups thereof, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A seed sampling system comprising:
an automated seed loading assembly operable to singulate seeds from a plurality of seeds, the seed loading assembly comprising multiple laterally spaced elevator units, each of the elevator units operable to actuate one of the singulated seeds into a position above the elevator unit;

an automated seed sampling assembly comprising multiple laterally spaced sampling modules, each of the sampling modules operable to remove tissue samples from one of the singulated seeds; and an automated seed transport assembly comprising multiple laterally spaced retention members operable to transfer the singulated seeds from the elevator units of the seed loading assembly to the sampling modules of the seed sampling assembly;

wherein the lateral spacing between the elevator units of the seed loading assembly, the lateral spacing between the sampling modules of the automated seed sampling assembly, and the lateral spacing between the retention members of the automated seed transport assembly are the same.

2. The system of claim 1, wherein the retention members are configured to orient the seeds received from the elevator units prior to presenting the seeds to the sampling modules.

3. The system of claim 2, wherein each of the retention members includes a suction cup configured to hold the singulated seeds received from the elevator units.

4. The system of claim 1, wherein the automated seed sampling assembly includes a number of sampling modules corresponding to a number of the retention members of the seed transport assembly.

5. The system of claim 1, further comprising:
a sample collection assembly configured to receive, from the seed sampling assembly, the tissue samples removed from the seeds; and
an imaging assembly adjacent the sample collection assembly configured to collect image data of the tissue samples when received at the sample collection assembly, and/or at least one sensor adjacent the sample collection assembly configured to measure a mass of tissue samples received at the sample collection assembly.

6. The system of claim 1, further comprising a seed imaging assembly configured to capture image data of the singulated seeds, while the singulated seeds are at the seed transport assembly.

7. The system of claim 1, further comprising a computing device configured to adjust operation of at least one component of the assembly, relating to the singulated seeds, between when the seed loading assembly singulates the seeds and when the seed sampling assembly removes tissue from the singulated seeds.

8. An automated method for removing tissue samples from seeds, the method comprising:
singulating a seed from a plurality of seeds;
engaging the singulated seed with a retention member of an automated seed transport assembly;
orienting the seed at the retention member by rotating an end portion of the retention member to thereby change a position of the seed on the retention member;
moving the oriented seed to a sampling module of an automated seed sampling assembly; and
removing a tissue sample from the singulated seed at the sampling module.

9. The method of claim 8, further comprising collecting, by an imaging assembly, image data of the seed; and wherein orienting the seed includes orienting the seed to a desired orientation based on the collected image data of the seed.

10. The method of claim 1 further comprising receiving the tissue sample removed from the singulated seed in a sample plate and receiving the singulated seed from which the tissue sample is removed in a seed tray.

11. The method of claim 10, further comprising assigning an identification to the seed and to the tissue sample removed from the seed, whereby the identification can be used to subsequently identify the seed in the seed tray and the corresponding tissue sample in the sample plate.

12. The method of claim 8, further comprising analyzing the tissue sample for one or more characteristics selected from the group consisting of a genetic marker, a single nucleotide polymorphism, a simple sequence repeat, a restriction fragment length polymorphism, a haplotype, a tag SNP, an alleles of a genetic marker, a gene, a DNA-derived sequence, an RNA-derived sequence, a promoter, a 5' untranslated region of a gene, a 3' untranslated region of a gene, microRNA, siRNA, a QTL, a satellite marker, a transgene, mRNA, ds mRNA, a transcriptional profile, and a methylation pattern.

13. The method of claim 8, further comprising analyzing the tissue sample and either selecting or not selecting the seed from which the tissue sample is removed based on the presence of one or more characteristics in the tissue sample that are genetically linked with a QTL selected from the group consisting of herbicide tolerance, disease resistance, insect or pest resistance, altered fatty acid, protein or carbohydrate metabolism, increased grain yield, increased oil, increased nutritional content, increased growth rates, enhanced stress tolerance, preferred maturity, enhanced organoleptic properties, altered morphological characteristics, other agronomic traits, traits for industrial uses, traits for improved consumer appeal, and a combination of traits as a multiple trait index.

14. The method of claim 8, further comprising analyzing the tissue sample and either selecting or not selecting the seed from which the tissue sample is removed based on the presence of one or more characteristics in the tissue sample that are genetically linked with a haplotype associated with a QTL selected from the group consisting of herbicide tolerance, disease resistance, insect or pest resistance, altered fatty acid, protein or carbohydrate metabolism, increased grain yield, increased oil, increased nutritional content, increased growth rates, enhanced stress tolerance, preferred maturity, enhanced organoleptic properties, altered morphological characteristics, other agronomic traits, traits for industrial uses, traits for improved consumer appeal, and a combination of traits as a multiple trait index.

15. The method of claim 8, wherein removing the tissue sample from the singulated seed at the sampling module includes removing the tissue sample from the singulated seed at a first sampling location of the sampling module; and
further comprising removing residual seed tissue from a second sampling location of the sampling module, via a collection port, at about the same time the tissue is removed from the singulated seed at the first sampling location of the sampling module.

16. The method of claim 8, wherein singulating the seed from the plurality of seeds includes singulating a pre-identified and individually contained, located, or managed seed from the plurality of seeds.

* * * * *